US012577942B2

(12) United States Patent
Harland et al.

(10) Patent No.: US 12,577,942 B2
(45) Date of Patent: Mar. 17, 2026

(54) METHODS OF SECURING A VESSEL DURING TRANSPORTATION, OFF-LOADING, AND INSTALLATION OF WIND TURBINE COMPONENTS

(71) Applicant: Crowley Wind Holdings, Inc., Jacksonville, FL (US)

(72) Inventors: Bruce Harland, Seattle, WA (US); Charles Jors, Seattle, WA (US)

(73) Assignee: Crowley New Energy, Inc., Jacksonville, FL (US)

( * ) Notice: Subject to any disclaimer, the term of this patent is extended or adjusted under 35 U.S.C. 154(b) by 701 days.

(21) Appl. No.: 17/946,590

(22) Filed: Sep. 16, 2022

(65) Prior Publication Data

US 2023/0081951 A1 Mar. 16, 2023

Related U.S. Application Data

(60) Provisional application No. 63/244,977, filed on Sep. 16, 2021.

(51) Int. Cl.
| | |
|---|---|
| *F03D 13/40* | (2016.01) |
| *B63B 21/20* | (2006.01) |

(Continued)

(52) U.S. Cl.
CPC .............. *F03D 13/40* (2016.05); *B63B 21/20* (2013.01); *B63B 35/44* (2013.01); *B63B 73/30* (2020.01);

(Continued)

(58) Field of Classification Search
CPC ......... F03D 13/40; B63B 21/20; B63B 35/44; B63B 73/30; B63B 75/00; B63B 77/10;

(Continued)

(56) References Cited

U.S. PATENT DOCUMENTS

| | | |
|---|---|---|
| 3,486,476 A | 12/1969 | Breit, Jr. |
| 3,512,495 A | 5/1970 | Fletcher |

(Continued)

FOREIGN PATENT DOCUMENTS

| | | |
|---|---|---|
| WO | 2011124270 A1 | 10/2011 |
| WO | 2012007002 A2 | 1/2012 |

(Continued)

*Primary Examiner* — Anthony D Wiest
(74) *Attorney, Agent, or Firm* — Michele V. Frank; Venable LLP

(57) ABSTRACT

A method of transporting a first vessel having wind turbine components to an offshore installation vessel. The method includes (i) securing the first vessel to a second vessel using a first tow line attached to a front end (or bow) of the first vessel, and (ii) securing the first vessel to a third vessel using a second tow line attached to a back end (or stern) of the first vessel. The method further includes transporting the first vessel to the offshore installation vessel using the second vessel and the third vessel secured to the first vessel via the first and second tow lines, respectively. The method also includes securing the first vessel to the offshore installation vessel. The first vessel can include one or more fender walls. The first vessel can be secured to the offshore installation vessel using one or more mooring lines.

38 Claims, 22 Drawing Sheets

(51) Int. Cl.

| | |
|---|---|
| *B63B 35/44* | (2006.01) |
| *B63B 73/30* | (2020.01) |
| *B63B 75/00* | (2020.01) |
| *B63B 77/10* | (2020.01) |

(52) U.S. Cl.
CPC .............. *B63B 75/00* (2020.01); *B63B 77/10* (2020.01); *B63B 2035/446* (2013.01); *F05B 2260/02* (2013.01)

(58) Field of Classification Search
CPC ........ B63B 2035/446; B63B 2021/563; B63B 21/56; B63B 35/003; B63B 35/28; F05B 2260/02; F05B 2230/61; B66C 23/185; B66C 23/52; Y02E 10/727
See application file for complete search history.

(56) References Cited

U.S. PATENT DOCUMENTS

| | | | |
|---|---|---|---|
| 3,656,447 | A | 4/1972 | Sniffin |
| 4,026,234 | A | 5/1977 | Zbilut |
| 4,041,888 | A | 8/1977 | Hooper |
| 4,165,705 | A | 8/1979 | Yoshikai |
| 4,805,548 | A | 2/1989 | Yamaguchi |
| 6,199,501 | B1 | 3/2001 | Kuhlman |
| 8,016,519 | B2 | 9/2011 | Bingham |
| 8,251,004 | B2 | 8/2012 | Olsen |
| 8,528,735 | B2 | 9/2013 | Nies |
| 8,640,340 | B2 | 2/2014 | Foo |
| 8,661,668 | B2 | 3/2014 | Vandenbulcke |
| 8,708,605 | B2 | 4/2014 | Cholley |
| 8,729,723 | B2 | 5/2014 | Boureau |
| 8,740,543 | B2 | 6/2014 | Weaver |
| 8,839,733 | B2 | 9/2014 | Grabau |
| 8,844,459 | B2 * | 9/2014 | Perez ...................... B63B 35/70 |
| | | | 114/144 RE |
| 9,003,631 | B2 | 4/2015 | Yamamoto |
| 9,022,691 | B2 | 5/2015 | Westergaard |
| 9,410,528 | B2 | 8/2016 | Westergaard |
| 9,476,409 | B2 | 10/2016 | Abiassi |
| 9,527,554 | B2 | 12/2016 | Lee |
| 9,561,839 | B2 | 2/2017 | Ahn |
| 9,828,071 | B2 | 11/2017 | Lopez |
| 10,215,161 | B2 | 2/2019 | Viselli |
| 10,308,327 | B1 | 6/2019 | Van Loon |
| 10,385,827 | B2 | 8/2019 | Botwright |
| 10,550,596 | B2 | 2/2020 | Santucci |
| 10,569,977 | B1 | 2/2020 | Hammer |
| 10,683,847 | B2 | 6/2020 | Da Silva |
| 10,752,154 | B2 | 8/2020 | Keller |
| 10,774,813 | B2 | 9/2020 | Fernandez Gomez |
| 10,920,443 | B2 | 2/2021 | Rabaut |
| 10,954,920 | B2 | 3/2021 | Botwright |
| 10,995,464 | B2 | 5/2021 | Van Loon |
| 10,995,734 | B2 | 5/2021 | Lee |
| 11,008,073 | B2 | 5/2021 | Hammer |
| 2010/0067989 | A1 | 3/2010 | Brown |
| 2013/0180444 | A1 * | 7/2013 | Harris ...................... F03D 13/25 |
| | | | 405/203 |
| 2017/0144739 | A1 * | 5/2017 | Ramstedt ................. B63H 5/15 |
| 2017/0370346 | A1 | 12/2017 | Botwright |
| 2020/0307925 | A1 | 10/2020 | Hammer |
| 2020/0309097 | A1 | 10/2020 | Hammer |
| 2021/0017727 | A1 * | 1/2021 | Van Loon ............. E02B 17/021 |
| 2021/0123203 | A1 | 4/2021 | Rabaut |
| 2021/0139290 | A1 | 5/2021 | Rabaut |
| 2021/0382484 | A1 * | 12/2021 | Jensen ................... B63B 21/56 |

FOREIGN PATENT DOCUMENTS

| | | | |
|---|---|---|---|
| WO | 2012175091 | A1 | 12/2012 |
| WO | 2019245366 | A1 | 12/2019 |
| WO | 2020020817 | A1 | 1/2020 |
| WO | 2020020819 | A1 | 1/2020 |
| WO | 2020020821 | A1 | 1/2020 |
| WO | 2020128016 | A1 | 6/2020 |
| WO | 2021038057 | A1 | 3/2021 |

* cited by examiner

METHODS OF SECURING A VESSEL DURING TRANSPORTATION, OFF-LOADING, AND INSTALLATION OF WIND TURBINE COMPONENTS

RELATED APPLICATIONS

This application claims the priority of U.S. provisional application No. 63/244,977, filed Sep. 16, 2021, which is incorporated by reference in its entirety for all purposes.

TECHNICAL FIELD

The present invention relates to methods of securing (or mooring) a vessel during transportation, off-loading, and/or installation of wind turbine components at an offshore location. In particular, the present invention relates to modifications to vessels and/or parallel tow line maneuvers to effectively secure a vessel during transportation, off-loading, and/or installation of wind turbine components.

BACKGROUND

Generally, wind turbines that are installed offshore involve the use of cranes and/or jack-up (or installation) vessels to lift the tower, turbine, and turbine blades into position. Typical offshore wind turbine installations require several vessels for each operation. When considering multiple turbine units, multiple lifts, multiple crews, and crane assets deployed, the cost of offshore wind turbine installations is considerably higher than land-based installations. The significantly higher costs affect the overall commercial viability of offshore wind turbine installations.

Specifically designed and purpose-built offshore wind turbine vessels are common in Europe and Asia, but are currently non-existent in the United States. Foreign vessels are unable to work in the U.S., due to the restriction of the Jones Act, which requires that the vessel be built in the U.S. and/or U.S.-flagged.

There is therefore a need for improved systems and/or methods of transporting, securing (or mooring), off-loading, and/or installing wind turbine components at an offshore location.

BRIEF SUMMARY OF THE INVENTION

According to one embodiment, the present invention provides a method of transporting a first vessel having wind turbine components to an offshore installation vessel. The method includes (i) securing the first vessel to a second vessel using a first tow line attached to a front end (or bow) of the first vessel, and (ii) securing the first vessel to a third vessel using a second tow line attached to a back end (or stern) of the first vessel. The method further includes transporting the first vessel to the offshore installation vessel using the second vessel and the third vessel secured to the first vessel via the first and second tow lines, respectively. The method also includes securing the first vessel to the offshore installation vessel.

According to another embodiment, the present invention provides a method of transporting a first vessel having wind turbine components to an offshore installation vessel in which the first vessel has fender walls. The method includes (i) providing a first vessel having one or more fender walls attached to at least one side of the first vessel, (ii) securing the first vessel to a second vessel using a first tow line attached to a front end (or bow) of the first vessel, and (iii)

securing the first vessel to a third vessel using a second tow line attached to a back end (or stern) of the first vessel. The method further includes transporting the first vessel to the offshore installation vessel using the second vessel and the third vessel secured to the first vessel via the first and second tow lines, respectively. The method also includes securing the first vessel to the offshore installation vessel, such that the one or more fender walls of the first vessel are positioned between the first vessel and the offshore installation vessel once the first vessel is secured to the offshore installation vessel.

According to yet another embodiment, the present invention provides a method of transporting a first vessel having wind turbine components in which the first vessel is provided with an opening to receive a secondary vessel. The method includes (i) providing a first vessel having an opening to receive a secondary vessel, (ii) positioning the secondary vessel within the opening of the first vessel, and (iii) transporting the first vessel to the offshore installation vessel using the secondary vessel.

Additional features, advantages, and embodiments of the invention are set forth or apparent from consideration of the following detailed description, drawings and claims. Moreover, it is to be understood that both the foregoing summary of the invention and the following detailed description are exemplary and intended to provide further explanation without limiting the scope of the invention as claimed.

DETAILED DESCRIPTION OF THE INVENTION

Throughout the specification and claims, the following terms take the meanings explicitly associated herein, unless the context clearly dictates otherwise. The phrases "in one embodiment," "in an embodiment," and "in some embodiments" as used herein do not necessarily refer to the same embodiment(s), though they may. Furthermore, the phrases "in another embodiment" and "in some other embodiments" as used herein do not necessarily refer to a different embodiment, although they may. All embodiments of the disclosure are intended to be combinable without departing from the scope or spirit of the disclosure.

As used herein, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, terms such as "comprising," "including," and "having" do not limit the scope of a specific claim to the materials or steps recited by the claim.

The present invention relates to methods of securing (or mooring) a vessel during transportation, off-loading, and/or installation of wind turbine components at an offshore location. In particular, the present invention relates to modifications to vessels and/or parallel tow line maneuvers to effectively secure a vessel during transportation, off-loading, and/or installation of wind turbine components.

Accordingly, one embodiment includes a method of transporting a first vessel having wind turbine components to an offshore installation vessel. The method includes (i) securing the first vessel to a second vessel using a first tow line attached to a front end (or bow) of the first vessel, and (ii) securing the first vessel to a third vessel using a second tow line attached to a back end (or stern) of the first vessel. The method further includes transporting the first vessel to the offshore installation vessel using the second vessel and the third vessel secured to the first vessel via the first and second tow lines, respectively. The method also includes securing the first vessel to the offshore installation vessel.

Figure 1A:
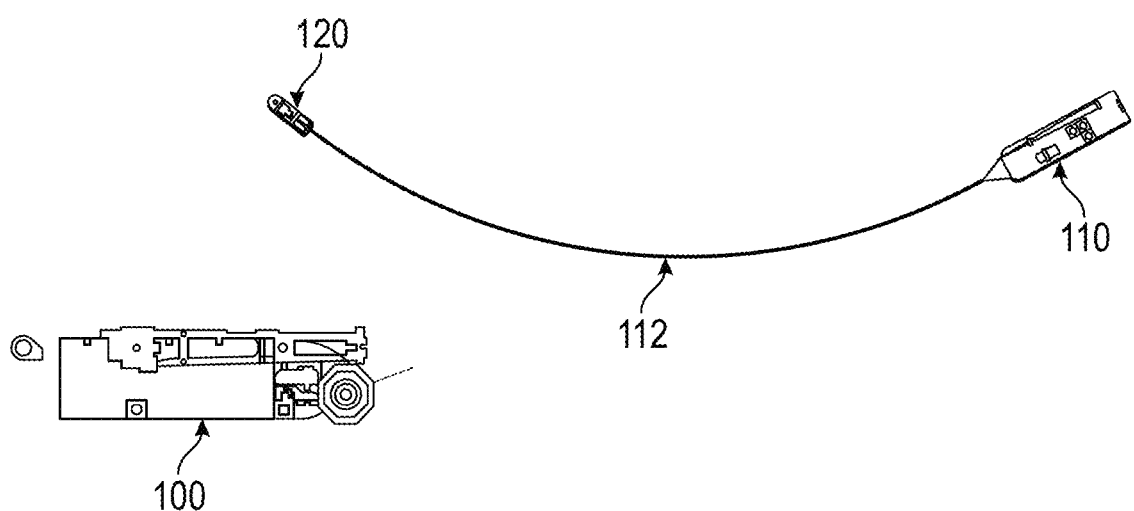
FIG. 1A illustrates a schematic top view of a vessel having wind turbine components to be transported and secured to an offshore installation vessel according to an embodiment of the invention.
Figure 1B:
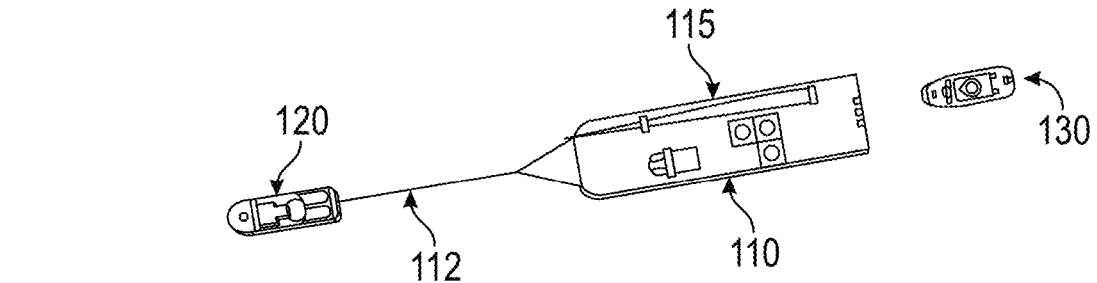
FIG. 1B illustrates a schematic top view of the vessel shown in FIG. 1A being transported to the offshore installation vessel according to an embodiment of the invention.
Figure 1B:
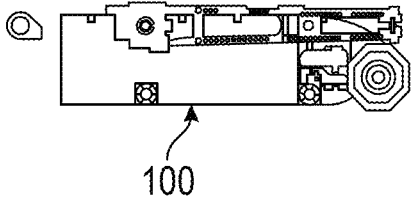
Figures 1C, 1D:
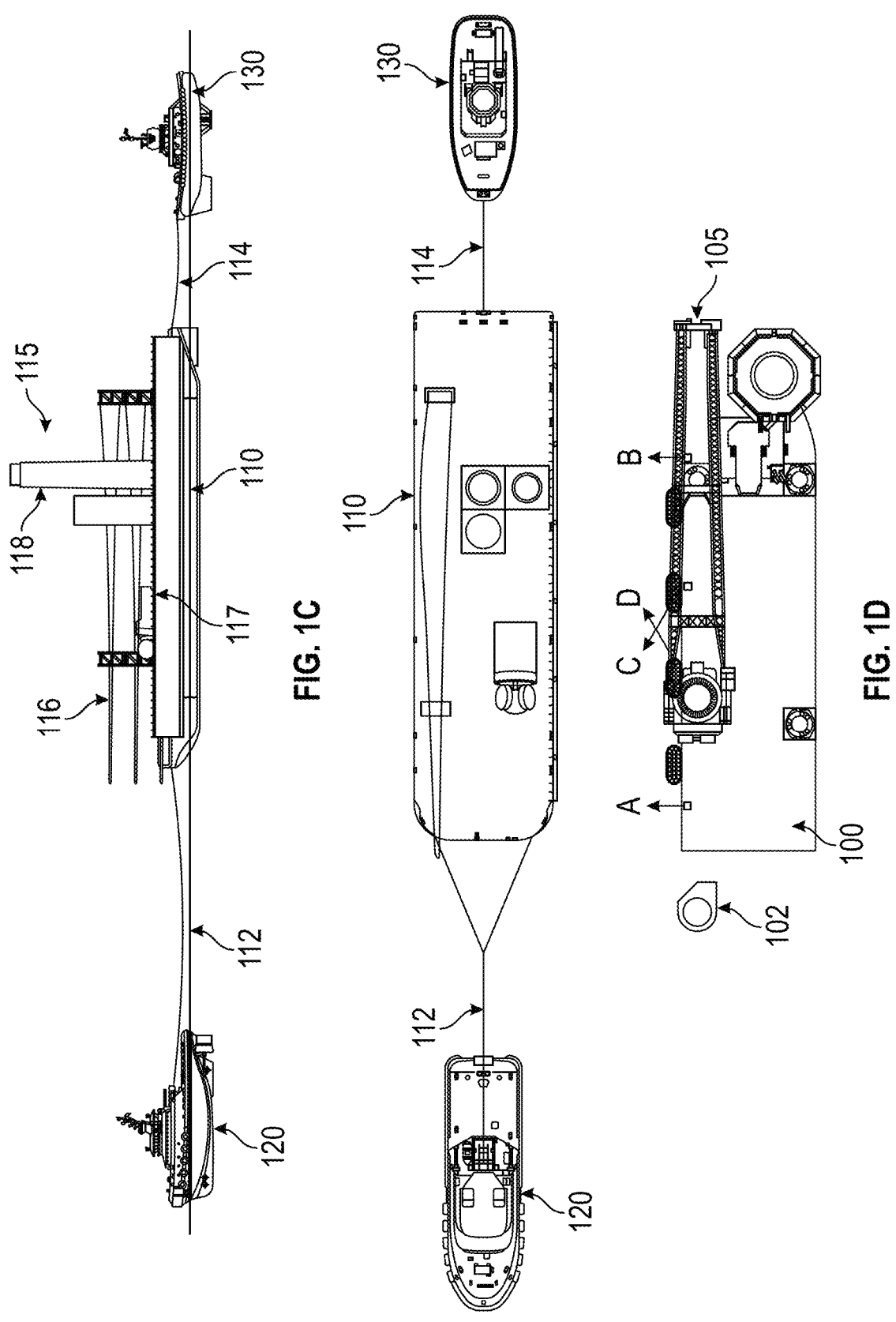
FIG. 1C illustrates a schematic side view of the vessel shown in FIG. 1A being transported using a pair of tow lines according to an embodiment of the invention.
FIG. 1D illustrates a schematic top view of the vessel shown in FIGS. 1A and IC being secured to the offshore installation vessel according to an embodiment of the invention.
Figure 1E:
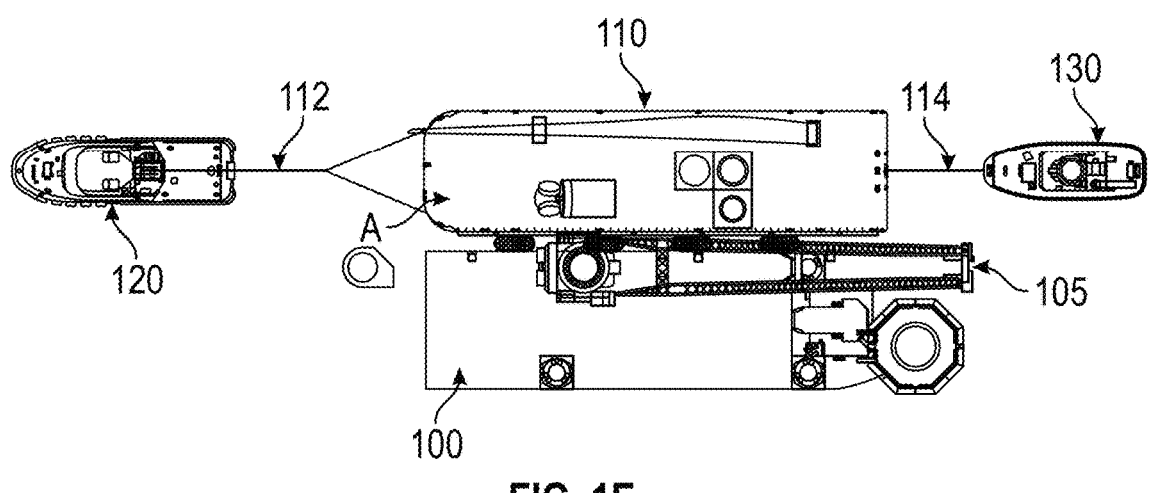
FIG. 1E illustrates a schematic top view of the vessel shown in FIGS. 1A and 1C being secured and attached to the offshore installation vessel according to an embodiment of the invention.
Figure 1F:
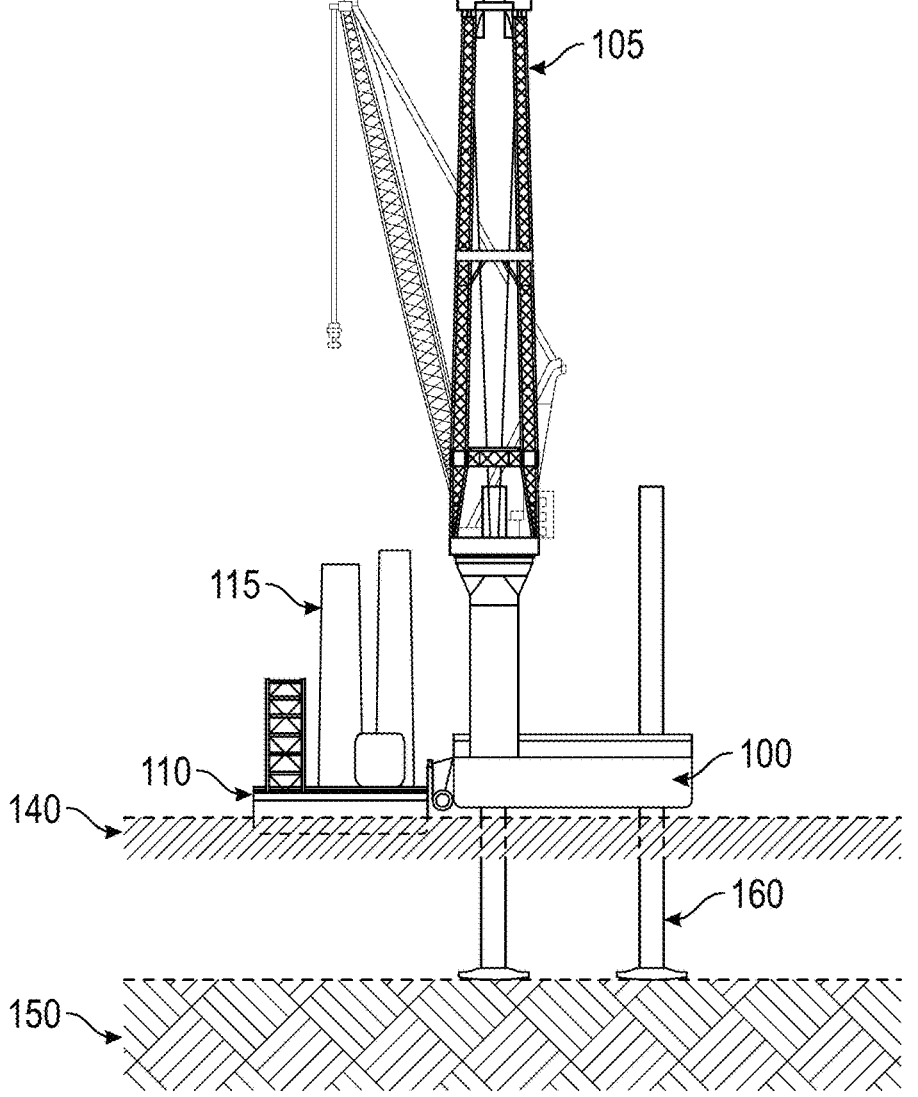
FIG. 1F illustrates a schematic side view of the vessel shown in FIG. 1E being secured and attached to the offshore installation vessel according to an embodiment of the invention.

FIGS. 1A-1F illustrate a method of transporting a first vessel having wind turbine components to an offshore installation vessel according to one embodiment of the invention. As shown in FIG. 1A, a first vessel 110 (e.g., a barge) is attached to a second vessel 120 (e.g., a tug boat or ocean class tug) via a first tow line 112 that is attached to the front end (or bow) of the first vessel 110, in order to transport the first vessel 110 to an offshore installation vessel 100, which is positioned at, for example, a monopile installation site for a wind turbine. As shown in FIGS. 1B and 1C, the first vessel 110 includes wind turbine components 115, such as, e.g., one or more blades 116 for the wind turbine, tower sections 118 (e.g., top and/or bottom tower sections) for the wind turbine, a nacelle 117, etc., for installing onto a monopile (see, e.g., monopile 102 of FIG. 1D) at an offshore installation site. As further shown in FIG. 1B, as the first vessel 110 approaches the offshore installation vessel 100, a third vessel 130 (e.g., another tug boat or assist tug) moves in to assist with the transport and/or maneuvering of the first vessel 110 as the first vessel 110 approaches the offshore installation vessel 100. For example, as shown in FIG. 1C, the first vessel 110 is attached to (i) the second vessel 120 via the first tow line 112 that is attached to the front end (or bow) of the first vessel 110 and (ii) the third vessel 130 via a second tow line 114 that is attached to the back end (or stern) of the first vessel 110. This pair of tow lines (i.e., the first tow line 112 and the second tow line 114) that is attached to the first vessel 110, as well as the second vessel 120 and the third vessel 130, respectively, allows for effectively transporting, maneuvering, and/or positioning the first vessel 110 with respect to the offshore installation vessel 100. Thus, as shown in FIGS. 1C and 1D, once the first vessel 110 is attached to the both the second vessel 120 and the third vessel 130 via the pair of tow lines (i.e., the first tow line 112 and the second tow line 114), the first vessel 110 is transported to and maneuvered/positioned alongside of the offshore installation vessel 100. As shown in FIG. 1D, once the first vessel 110 is maneuvered/positioned alongside of the offshore installation vessel 100, mooring lines (A-D) are released (or passed) from the offshore installation vessel 100 to secure the first vessel 110 to the offshore installation vessel 100. For example, as shown in FIG. 1D, a first mooring line A is released from a front side of the offshore installation vessel 100 to attach to the front side (or bow) of the first vessel 110, a second mooring line B is released from a back side of the offshore installation vessel 100 to attach to the back side (or stern) of the first vessel 110, and third and fourth mooring lines C and D are released from a side of the offshore installation vessel 100 to attach to a side (e.g., port) of the first vessel 110. Thereafter, as shown in FIG. 1E, once the mooring lines (A-D) are attached to the first vessel 110, the mooring lines (A-D) can be tightened and/or the first vessel 110 can be pulled directly alongside of the offshore installation vessel 100 in order to secure and/or to attach the first vessel 110 to the offshore installation vessel 100 via the mooring lines (A-D). Once the first vessel 110 is secured and/or attached to the offshore installation vessel 100, the various wind turbine components 115 can be transported off of the first vessel 110 to the offshore installation vessel 100 using, for example, a crane 105 positioned on the offshore installation vessel 100. For example, as shown in FIG. 1F, the offshore installation vessel 100 includes one or more stabilizing structures 160 (e.g., jack-up legs) that position the offshore installation vessel 100 on the sea floor or ocean floor 150 and at or above the ocean surface 140, as the first vessel 110 floats on the ocean surface 140. By stabilizing the offshore installation vessel 100 on the ocean floor 150 and at or above the ocean surface 140, using the one or more stabilizing structures 160 (e.g., jack-up legs), the offshore installation vessel 100 can remain stationary while the first vessel 110 floats on the ocean surface 140. By then mooring, securing and/or attaching the first vessel 110 to the offshore installation vessel 100, as discussed above, the various wind turbine components 115 can be effectively, efficiently, and safely transported off of the first vessel 110 to the offshore installation vessel 100 using, for example, a crane 105 positioned on the stationary offshore installation vessel 100.

According to another embodiment, a method of transporting a first vessel having wind turbine components to an offshore installation vessel is provided in which the first vessel includes one or more fender walls. The method includes (i) providing a first vessel having one or more fender walls attached to at least one side of the first vessel, (ii) securing the first vessel to a second vessel using a first tow line attached to a front end (or bow) of the first vessel, and (iii) securing the first vessel to a third vessel using a second tow line attached to a back end (or stern) of the first vessel. The method further includes transporting the first vessel to the offshore installation vessel using the second vessel and the third vessel secured to the first vessel via the first and second tow lines. The method also includes securing the first vessel to the offshore installation vessel, such that the one or more fender walls of the first vessel are positioned between the first vessel and the offshore installation vessel once the first vessel is secured to the offshore installation vessel.

Figure 2A:
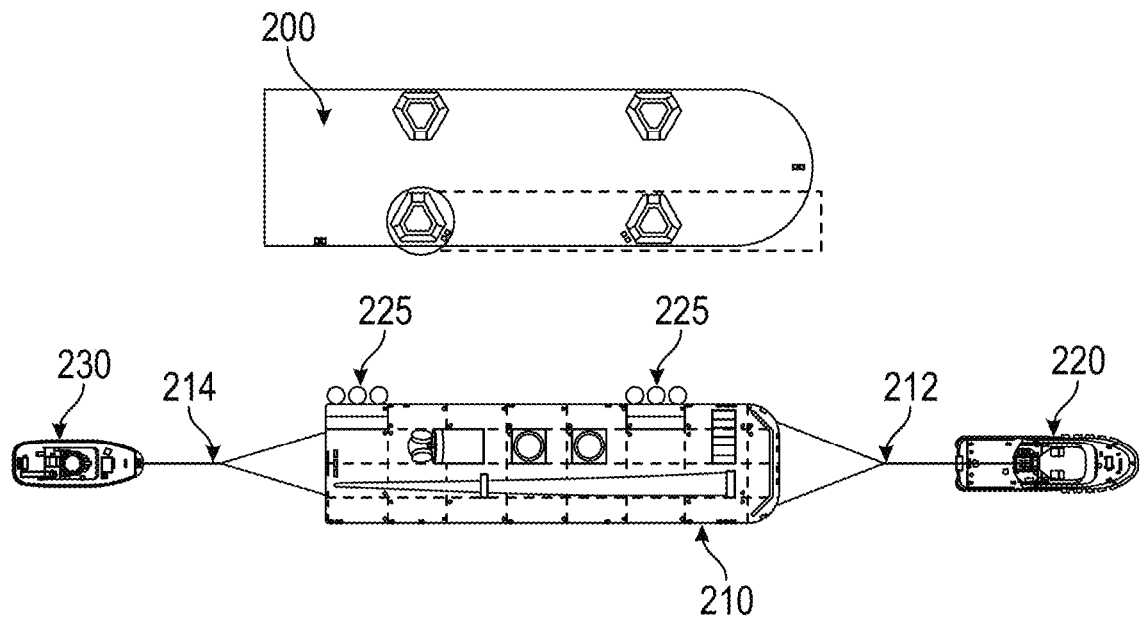
FIG. 2A illustrates a schematic top view of a vessel having wind turbine components to be transported and secured to an offshore installation vessel according to an embodiment of the invention.

FIGS. 2A-2E illustrate a method of transporting a first vessel having wind turbine components and a fender wall(s) to an offshore installation vessel according to an embodiment of the invention. As shown in FIG. 2A, a first vessel 210 (e.g., a barge) is provided that includes at least two fender walls 225 attached to at least one side (e.g., a port side) of the first vessel 210. According to one embodiment, the first vessel 210 is outfitted with the fender walls 225 by modifying a conventional barge to include the fender walls 225. According to one embodiment, the first vessel 210 is outfitted with fender walls 225 by attaching 4.5 meter×12 meter fenders to at least one side of the first vessel 210.

Figure 2B:
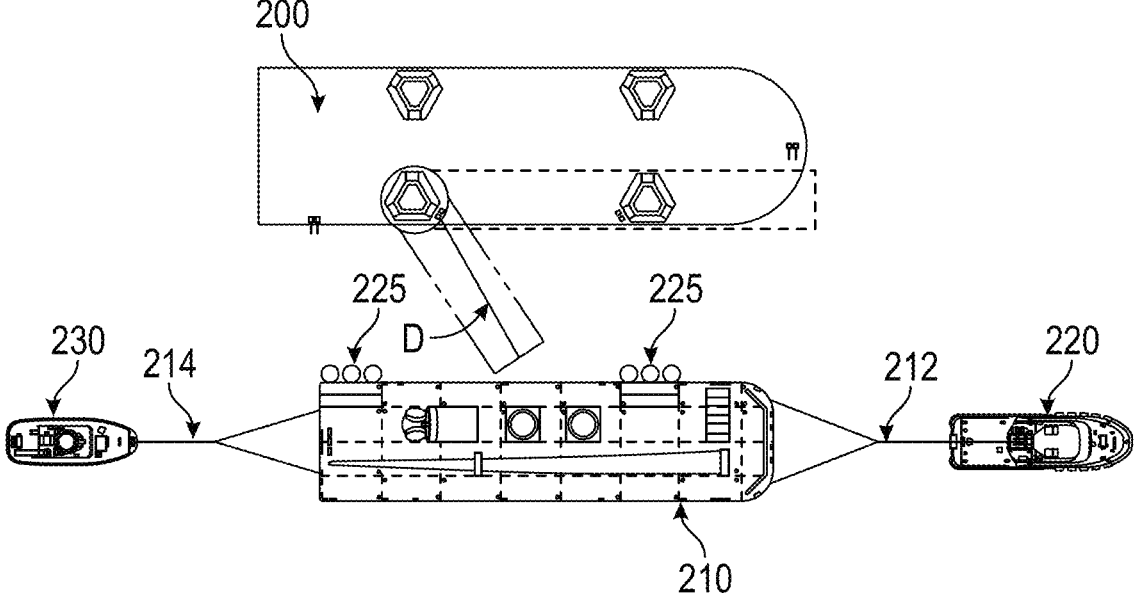
FIG. 2B illustrates a schematic top view of the vessel shown in FIG. 2A being secured to the offshore installation vessel according to an embodiment of the invention.
Figure 2C:
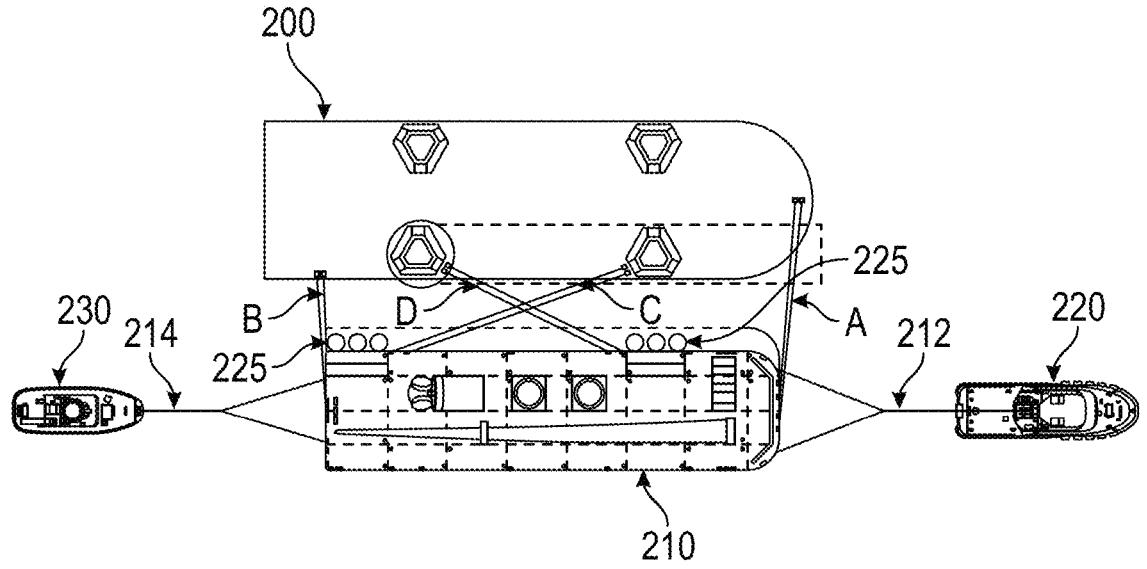
FIG. 2C illustrates a schematic top view of the vessel shown in FIG. 2A being secured and attached to the offshore installation vessel according to an embodiment of the invention.
Figure 2D:
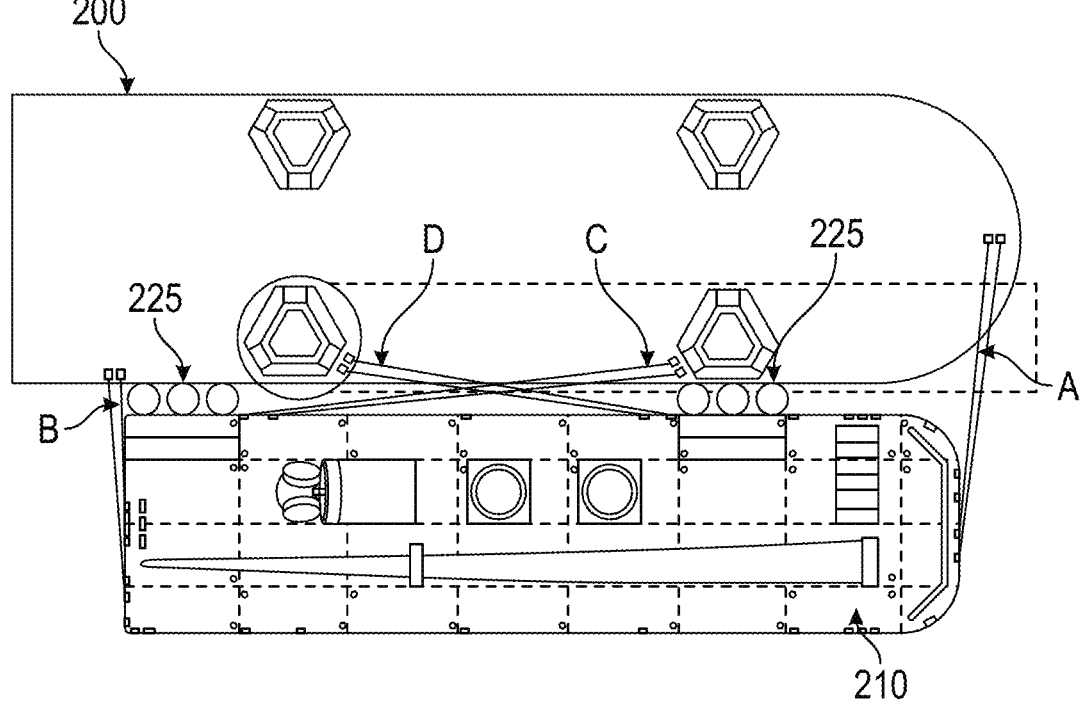
FIG. 2D illustrates a schematic top view of the vessel shown in FIG. 2A being further secured and attached to the offshore installation vessel according to an embodiment of the invention.
Figure 2E:
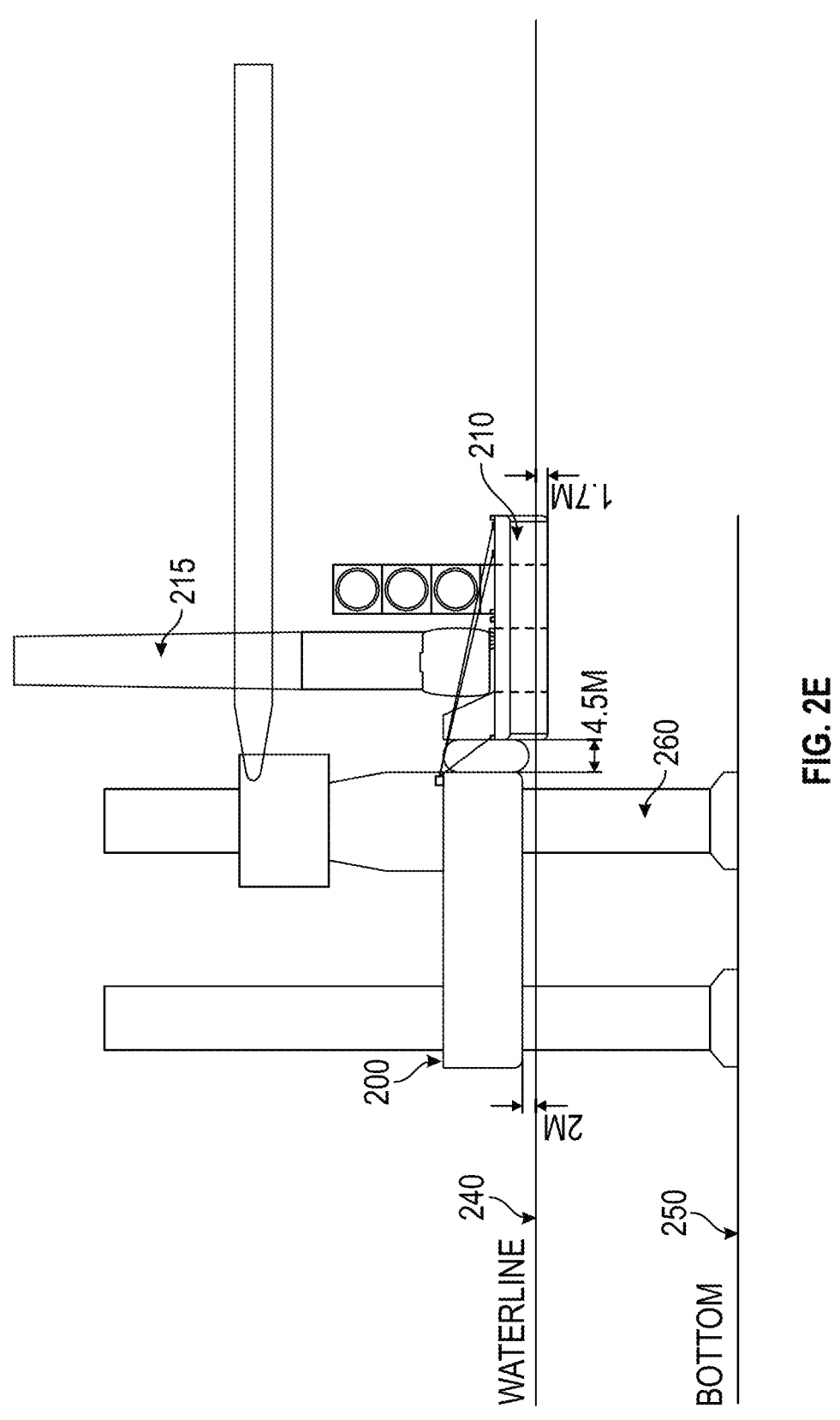
FIG. 2E illustrates a schematic side view of the vessel shown in FIG. 2D being further secured and attached to the offshore installation vessel according to an embodiment of the invention.

As further shown in FIG. 2A, the first vessel 210 is attached to (i) a second vessel 220 (e.g., a tug boat or ocean class tug) via a first tow line 212 that is attached to the front end (or bow) of the first vessel 210, and (ii) a third vessel 230 (e.g., another tug boat or titan class tug) via a second tow line 214 that is attached to the back end (or stern) of the first vessel 210, in order to transport the first vessel 210 to an offshore installation vessel 200, which is positioned at, for example, a monopile installation site for a wind turbine. The pair of tow lines (i.e., the first tow line 212 and the second tow line 214) that is attached to the first vessel 210, as well as the second vessel 220 and the third vessel 230, respectively, allows for effectively transporting, maneuvering, and/or positioning the first vessel 210 with respect to the offshore installation vessel 200. Thus, as shown in FIGS. 2A and 2B, once the first vessel 210 is attached to the both the second vessel 220 and the third vessel 230 via the pair of tow lines (i.e., the first tow line 212 and the second tow line 214), the first vessel 210 is transported to and maneuvered/positioned alongside of the offshore installation vessel 200. As shown in FIGS. 2B and 2C, once the first vessel 210 is maneuvered/positioned alongside of the offshore installation vessel 200, mooring lines (A-D) are released (or passed) from the offshore installation vessel 200 to secure the first vessel 210 to the offshore installation vessel 200. For example, as shown in FIG. 2B, a side mooring line D is released (or thrown) from a side of the offshore installation vessel 200 using, e.g., a constant tension winch(es) to attach to a side (e.g., port) of the first vessel 210. Thereafter, as shown in FIG. 2C, once the mooring lines (A-D) are attached to the first vessel 210, the mooring lines (A-D) can be tightened and/or the first vessel 210 can be pulled directly alongside of the offshore installation vessel 200 in order to secure and/or to attach the first vessel 210 to the offshore installation vessel 200 via the mooring lines (A-D). Once the first vessel 210 is secured and/or attached to the offshore installation vessel 200, as shown in FIG. 2D, the first tow line 212 (and the second vessel 220) and the second tow line 214 (and the third vessel 230) can be disconnected from the first vessel 210, which allows for the second vessel 220 and the third vessel 230 to leave the first vessel 210 secured and/or attached to the offshore installation vessel 200. As further shown in FIGS. 2C and 2D, once the first vessel 210 is secured to the offshore installation vessel 200, the fender walls 225 of the first vessel 210 are positioned between the first vessel 210 and the offshore installation vessel 200 in order to stabilize the first vessel 210 with respect to the offshore installation vessel 200. Thereafter, various wind turbine components (see, e.g., wind turbine components 215 of FIG. 2E) can be transported off of the first vessel 210 to the offshore installation vessel 200 using, for example, a crane (not shown) positioned on the offshore installation vessel 200. For example, as shown in FIG. 2E, the offshore installation vessel 200 includes one or more stabilizing structures 260 (e.g., jack-up legs) that position the offshore installation vessel 200 on the sea floor or ocean floor 250 and at or above the ocean surface 240 (or waterline), as the first vessel 210 floats on the ocean surface 240. By stabilizing the offshore installation vessel 200 on the ocean floor 250 and at or above the ocean surface 240, using the one or more stabilizing structures 260 (e.g., jack-up legs), the offshore installation vessel 200 can remain stationary while the first vessel 210 floats on the ocean surface 240. By then mooring, securing and/or attaching the first vessel 210 to the offshore installation vessel 200, as discussed above, the various wind turbine components 215 can be effectively, efficiently, and safely transported off of the first vessel 210 to the offshore installation vessel 200 using, for example, a crane (not shown) positioned on the stationary offshore installation vessel 200.

Figures 3A, 3B:
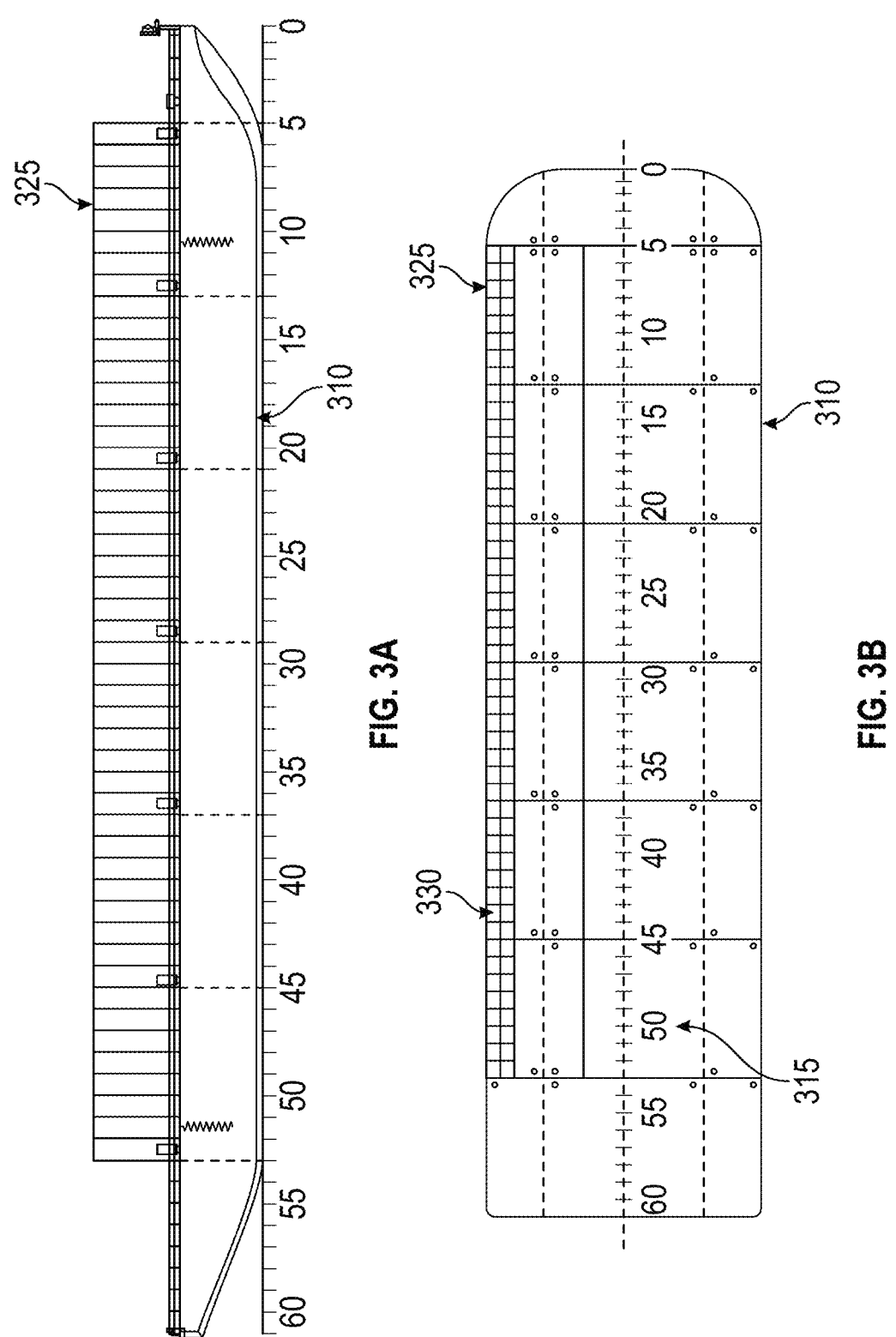
FIG. 3A is a schematic side view of a vessel having at least one fender wall according to an embodiment of the invention.
FIG. 3B is a schematic top view of the vessel shown in FIG. 3A having at least one fender wall according to an embodiment of the invention.

FIGS. 3A and 3B illustrate a vessel (e.g., a barge) that is outfitted with a fender wall according to an embodiment of the invention. For example, as shown in FIG. 3A, a vessel 310 (e.g., a barge) is outfitted with a fender wall 325 that is positioned or attached along one side (e.g., a port side) of the vessel 310. As shown in FIG. 3B, the vessel 310 includes a main deck 315 with the fender wall 325 disposed along one side 330 (e.g., a port side) of the main deck 315. According to one embodiment, the fender wall 325 is made of a material that is ABS shipbuilding steel, grade A. According to an embodiment, the fender wall(s) (e.g., fender wall 325) comprise stiffeners having double continuous welds at the ends and in way of transverse webs that are equal in length to the depth of the longitudinal axis of the fender wall. According to another embodiment, the fender wall(s) (e.g., fender wall 325) is designed for a 10.8 feet×32.8 feet fender that is centered 20.6 feet above the deck (e.g., main deck 315). According to an embodiment, a maximum allowable fender loading into the fender wall is estimated to be about 200 long tons (LT).

Figures 4A, 4B, 4C:
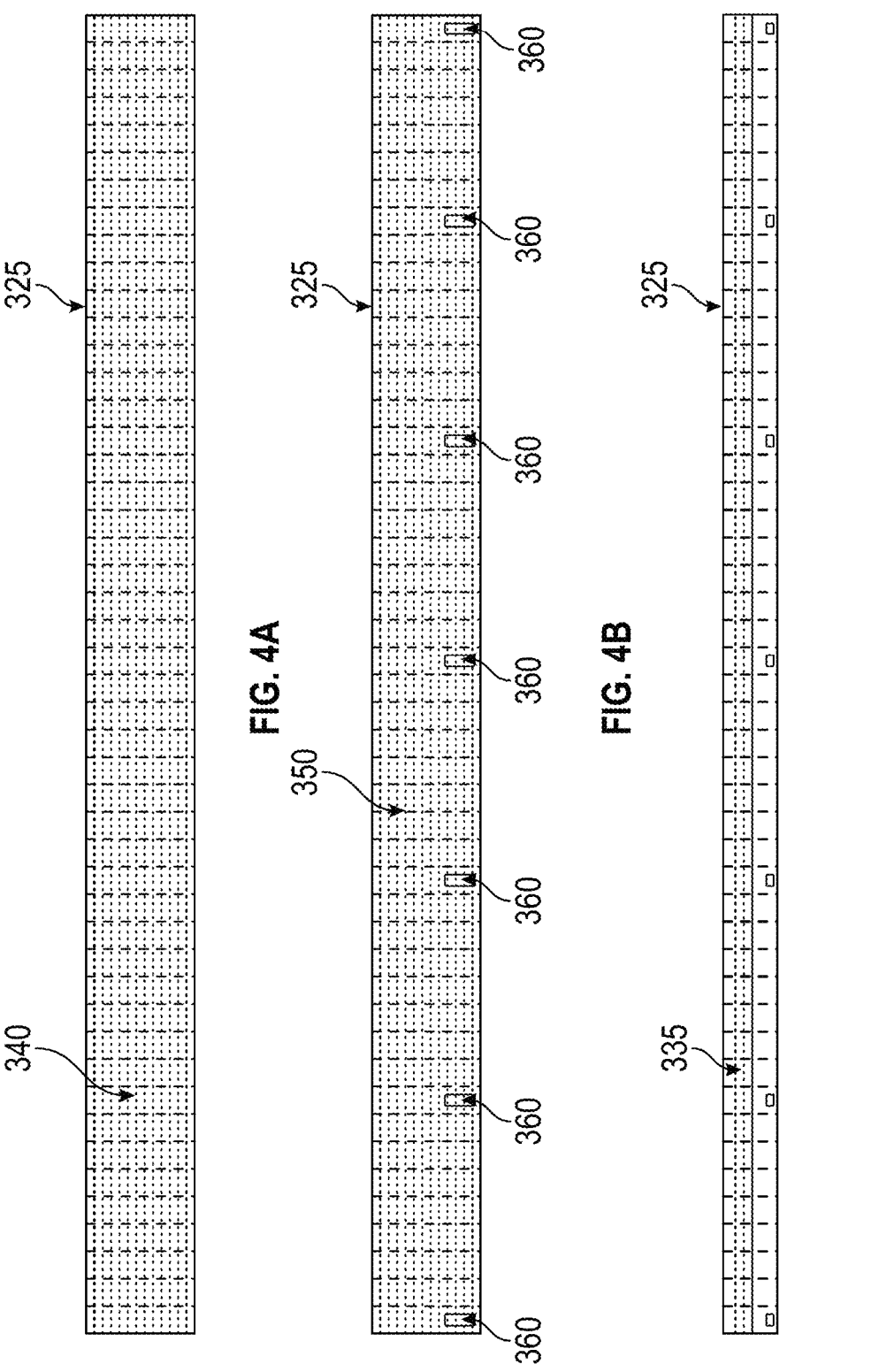
FIG. 4A is a schematic side view of a fender wall from an outboard side according to an embodiment of the invention.
FIG. 4B is a schematic side view of the fender wall shown in FIG. 4A from an inboard side according to an embodiment of the invention.
FIG. 4C is a schematic top view of the fender wall shown in FIG. 4A according to an embodiment of the invention.
Figure 4D:
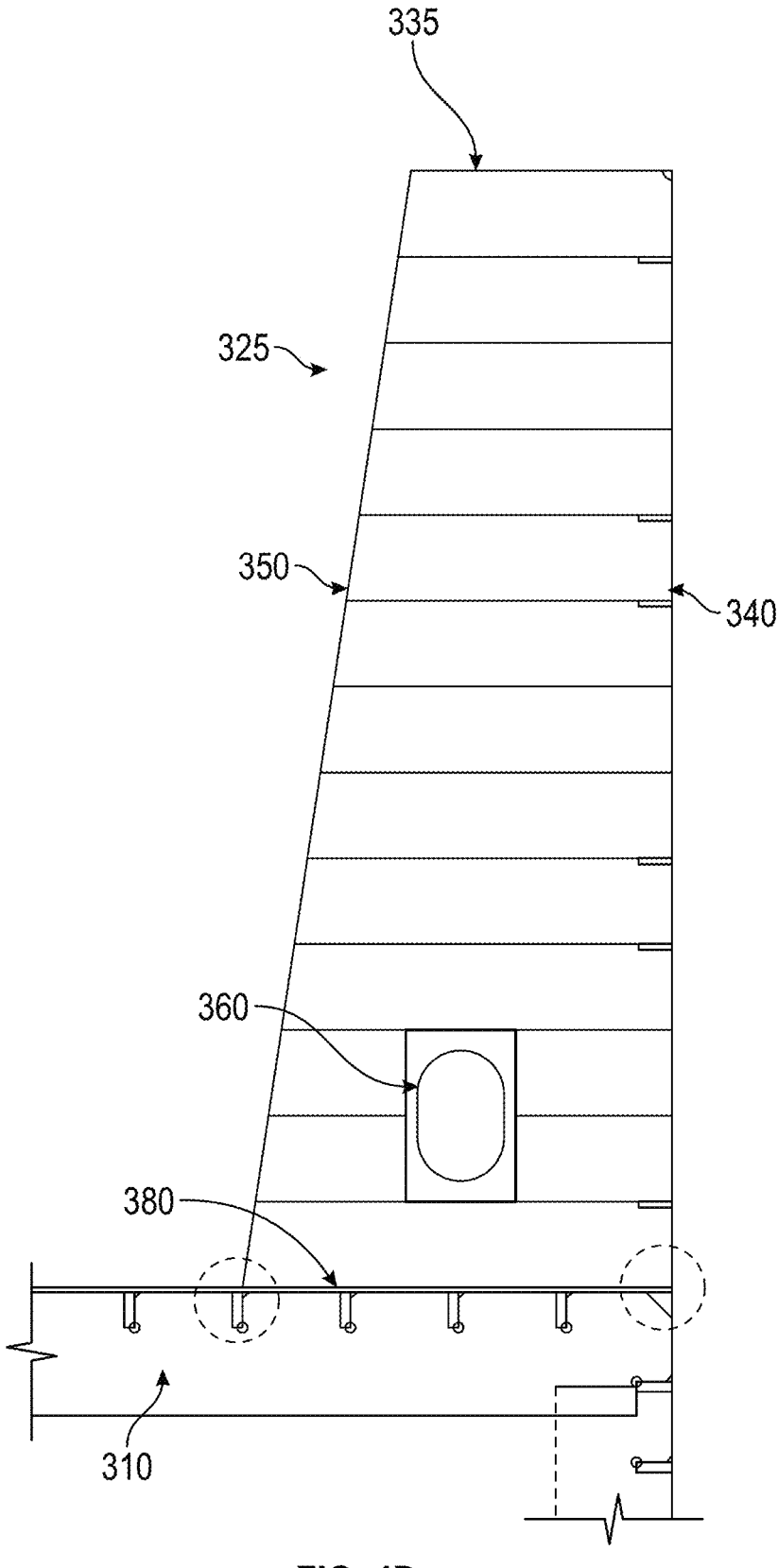
FIG. 4D is a schematic end view of the fender wall shown in FIGS. 4A-4D according to an embodiment of the invention.

FIGS. 4A-4D illustrate further details of the fender wall 325 of FIGS. 3A and 3B according to an embodiment of the invention. The fender wall 325 shown in FIGS. 4A-4D provides example framing for a fender wall where the longitudinal structure is intercostal between frames at equal spacing. In this example, as shown in FIG. 4A, the fender wall 325 includes a first side wall 340 that is disposed along the outboard side of the fender wall 325 (i.e., looking to starboard side). As shown in FIG. 4B, the fender wall 325 further includes a second side wall 350 along an inboard side of the fender wall 325 (i.e., looking to port side). As shown in the embodiment of FIG. 4B, the second side wall 350 includes access openings 360 that allow for access to the fender wall 325 internals and to a top structure 335 of the fender wall 325 to allow for access to mooring fittings and installation vessel access. As shown in the embodiment of FIG. 4C, the fender wall 325 also includes a top wall or structure 335 that extends from one end to a second end of the vessel (see, e.g., vessel 310 of FIGS. 3A and 3B). As shown in the embodiment of FIG. 4D the fender wall 325 is welded at a bottom end 380 to the vessel 310 (e.g., barge). As also shown in the embodiment of FIG. 4D, the first side wall 340 of the fender wall 325 extends directly from the bottom end 380 to the top wall 335 in a direction that is substantially perpendicular to the vessel 310, while the second side wall 350 of the fender wall 325 extends from the bottom end 380 to the top wall 335 at an angle. Thus, as shown in the end view of FIG. 4D, the fender wall 325 tapers inwardly from the bottom end 380 to the top wall 335 due to the inward angle of the second side wall 350.

According to another embodiment, a method of transporting a first vessel having wind turbine components to an offshore installation vessel is provided in which the first vessel is provided with an opening to receive a secondary vessel. The method includes (i) providing a first vessel having, an opening to receive a secondary vessel, (ii) positioning the secondary vessel within the opening of the first vessel, and (iii) transporting the first vessel to the offshore installation vessel using the secondary vessel. According to one embodiment, the method also includes securing the first vessel to the offshore installation vessel using one or more mooring lines. According to another embodiment, the method includes holding the first vessel alongside of the offshore installation vessel using the secondary vessel positioned within the opening of the first vessel.

Figure 5A:
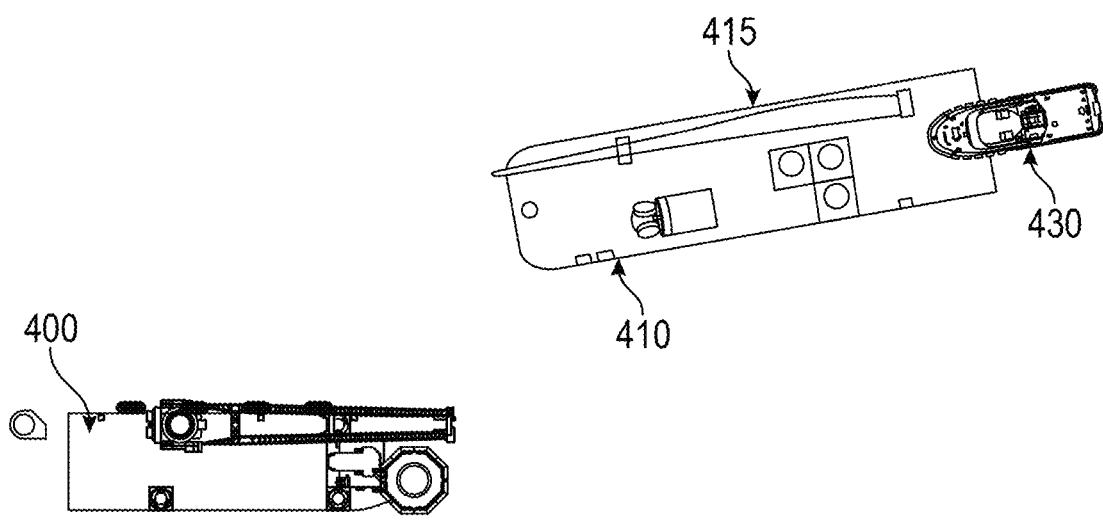
FIG. 5A illustrates a schematic top view of a vessel having wind turbine components to be transported and secured to an offshore installation vessel according to an embodiment of the invention.
Figure 5B:
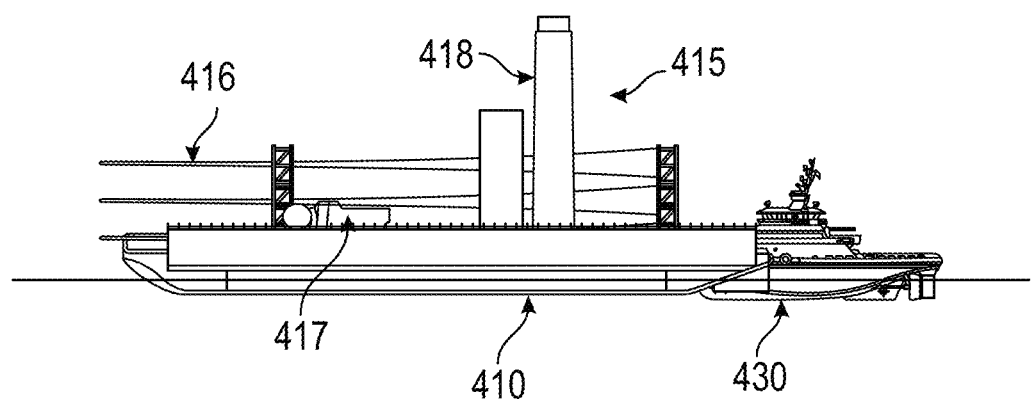
FIG. 5B illustrates a schematic side view of the vessel shown in FIG. 5A being transported using a single barge according to an embodiment of the invention.

FIGS. 5A-5E illustrate a method of transporting a first vessel having wind turbine components to an offshore installation vessel according to an embodiment of the invention. As shown in FIG. 5A, a first vessel 410 (e.g., a barge) is provided that is configured to receive a secondary vessel 430 (e.g., a tug boat) within an opening (see, e.g., opening 435 of FIG. 5C) of the first vessel 410, in order to transport the first vessel 410 to an offshore installation vessel 400, which is positioned at, for example, a monopile installation site for a wind turbine. As shown in FIGS. 5A and 5B, the first vessel 410 includes wind turbine components 415, such as, e.g., one or more blades 416 for the wind turbine, tower sections 418 (e.g., top and/or bottom tower sections) for the wind turbine, a nacelle 417, etc., for installing onto a monopile (see, e.g., monopile 402 of FIG. 5D) at an offshore installation site.

Figure 5C:
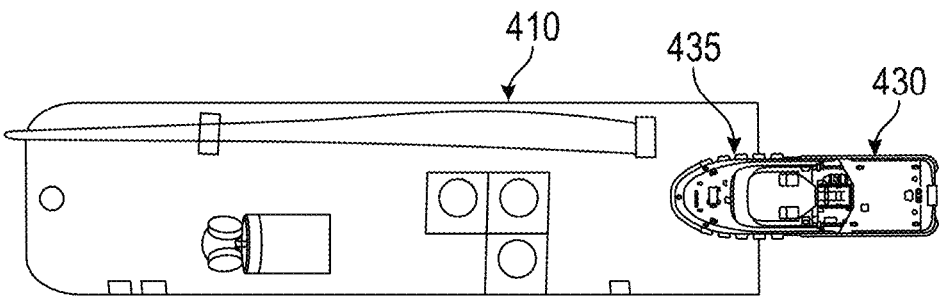
FIG. 5C illustrates a schematic top view of the vessel shown in FIG. 5A being secured to the offshore installation vessel according to an embodiment of the invention.
Figure 5C:
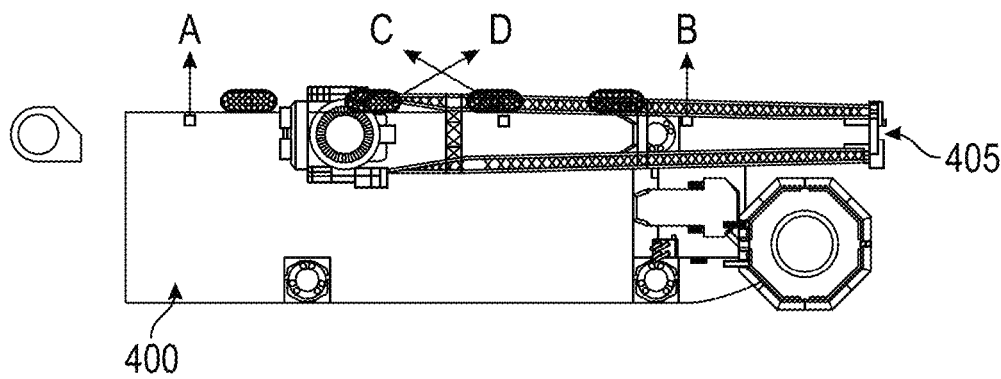
Figure 5D:
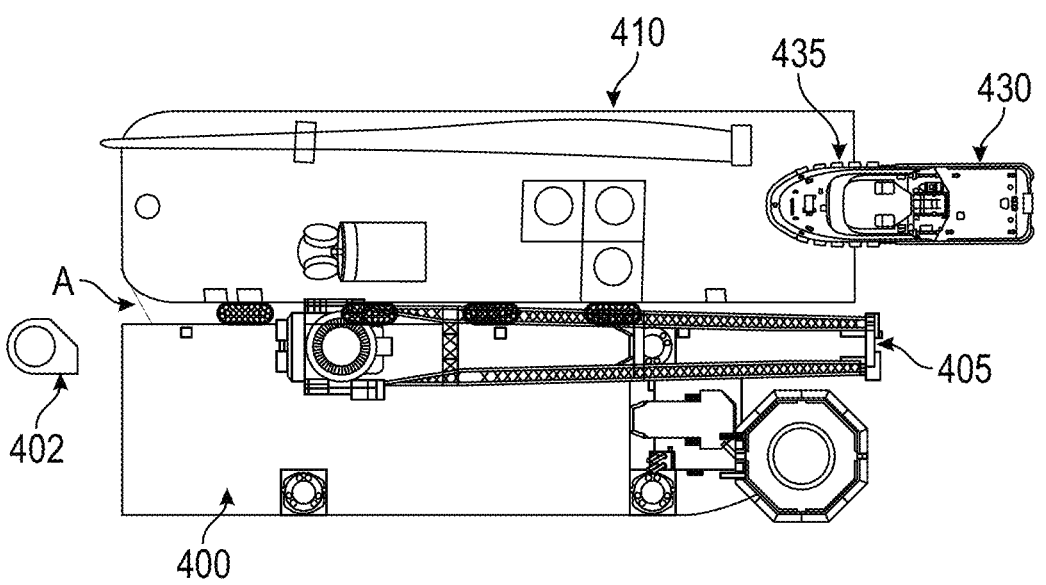
FIG. 5D illustrates a schematic top view of the vessel shown in FIG. 5A being secured and attached to the offshore installation vessel according to an embodiment of the invention.
Figure 5E:
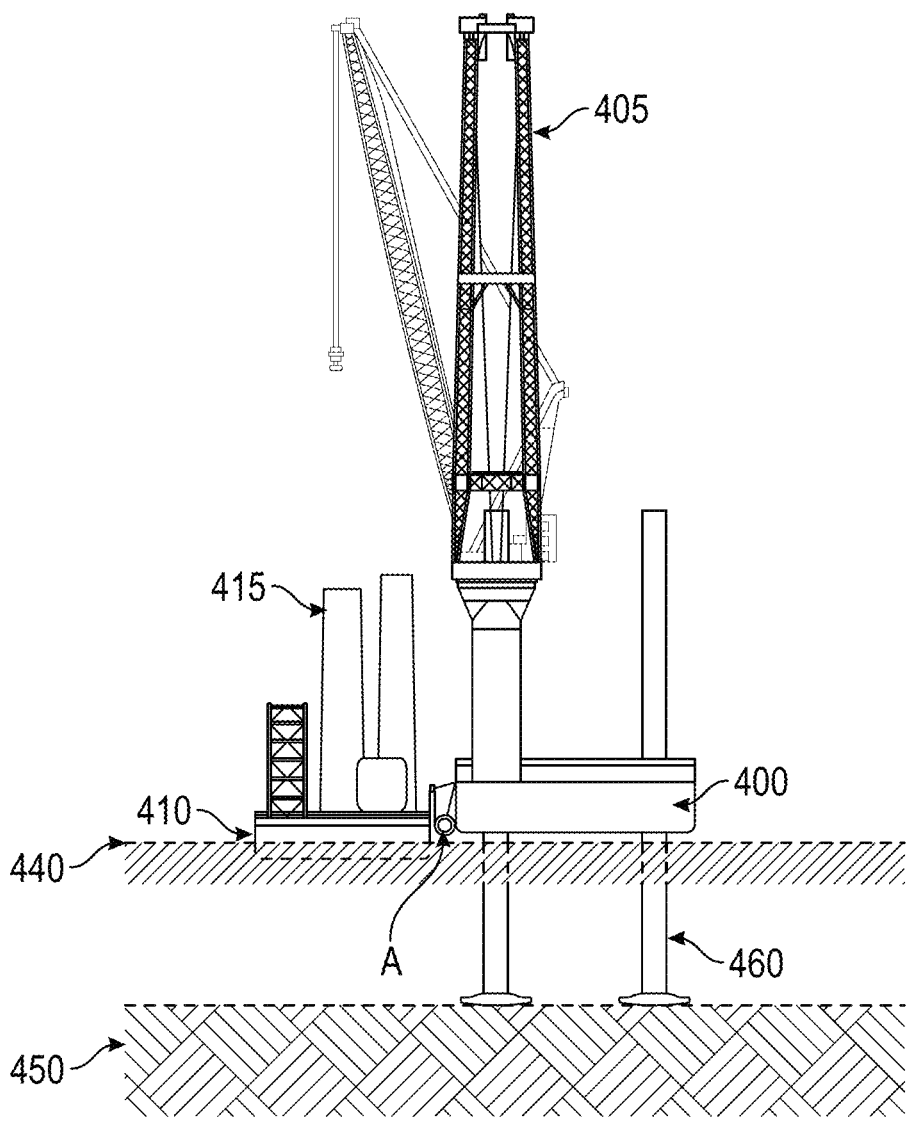
FIG. 5E illustrates a schematic side view of the vessel shown in FIG. 5D being secured and attached to the offshore installation vessel according to an embodiment of the invention.

As shown in FIG. 5C, as the first vessel 410 approaches the offshore installation vessel 400, the secondary vessel 430 transports and/or maneuvers the first vessel 410 alongside of the offshore installation vessel 400. As further shown in FIG. 5C, once the first vessel 410 is maneuvered/positioned alongside of the offshore installation vessel 400, mooring lines (A-D) are released (or passed) from the offshore installation vessel 400 to secure the first vessel 410 to the offshore installation vessel 400. For example, as shown in FIG. 5C, a first mooring line A is released from a front side of the offshore installation vessel 400 to attach to the front side (or bow) of the first vessel 410, a second mooring line B is released from a back side of the offshore installation vessel 400 to attach to the back side (or stern) of the first vessel 410, and third and fourth mooring lines C and D are released from a side of the offshore installation vessel 400 to attach to a side (e.g., port) of the first vessel 410. Thereafter, as shown in FIG. 5D, once the mooring lines (A-D) are attached to the first vessel 410, the mooring lines (A-D) can be tightened and/or the first vessel 410 can be pulled directly alongside of the offshore installation vessel 400 in order to secure and/or to attach the first vessel 410 to the offshore installation vessel 400 via the mooring lines (A-D). Once the first vessel 410 is secured and/or attached to the offshore installation vessel 400, the various wind turbine components 415 can be transported off of the first vessel 410 to the offshore installation vessel 400 using, for example, a crane 405 positioned on the offshore installation vessel 400. For example, as shown in FIG. 5E, the offshore installation vessel 400 includes one or more stabilizing structures 460 (e.g., jack-up legs) that position the offshore installation vessel 400 on the sea floor or ocean floor 450 and at or above the ocean surface 440, as the first vessel 410 floats on the ocean surface 440. By stabilizing the offshore installation vessel 400 on the ocean floor 450 and at or above the ocean surface 440, using the one or more stabilizing structures 460 (e.g., jack-up legs), the offshore installation vessel 400 can remain stationary while the first vessel 410 floats on the ocean surface 440. By then mooring (see, e.g., attached mooring line A of FIG. 5E), securing and/or attaching the first vessel 410 to the offshore installation vessel 400, as discussed above, the various wind turbine components 415 can be effectively, efficiently, and safely transported off of the first vessel 410 to the offshore installation vessel 400 using, for example, a crane 405 positioned on the stationary offshore installation vessel 400.

Figure 6A:
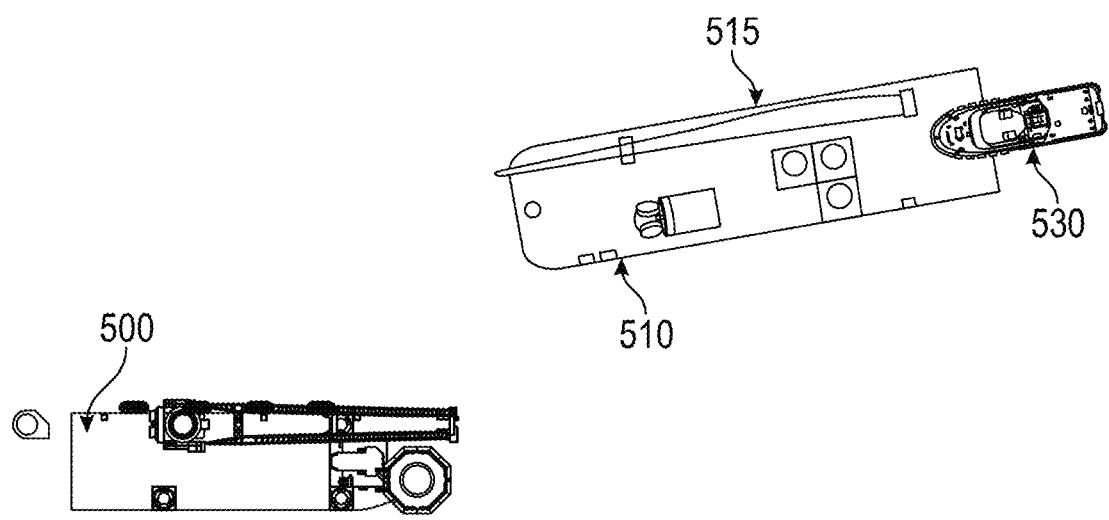
FIG. 6A illustrates a schematic top view of a vessel having wind turbine components to be transported to an offshore installation vessel according to an embodiment of the invention.
Figure 6B:
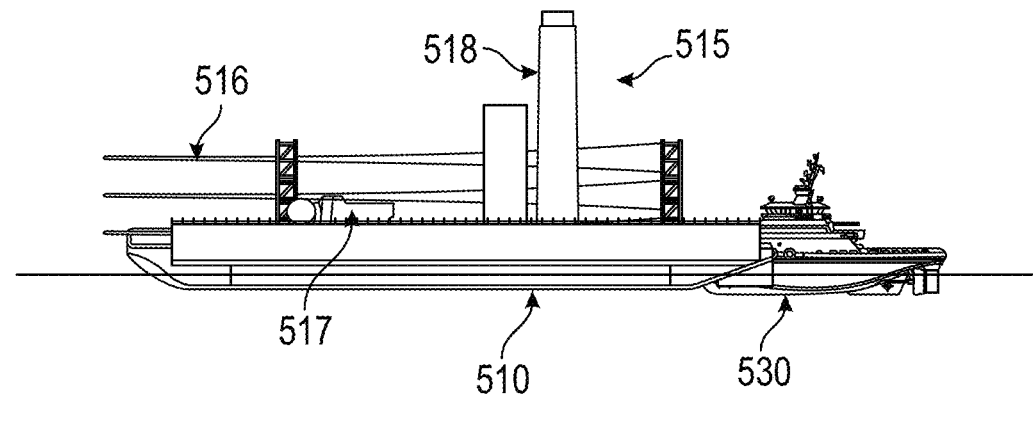
FIG. 6B illustrates a schematic side view of the vessel shown in FIG. 6A being transported using a single barge according to an embodiment of the invention.

FIGS. 6A-6D illustrate another method of transporting a first vessel having wind turbine components to an offshore installation vessel according to an embodiment of the invention. As shown in FIG. 6A, a first vessel 510 (e.g., a barge) is provided that is configured to receive a secondary vessel 530 (e.g., a tug boat or ocean class tug) within an opening (see, e.g., opening 535 of FIG. 6C) of the first vessel 510, in order to transport the first vessel 510 to an offshore installation vessel 500, which is positioned at, for example, a monopile installation site for a wind turbine. As shown in FIGS. 6A and 6B, the first vessel 510 includes wind turbine components 515, such as, e.g., one or more blades 516 for the wind turbine, tower sections 518 (e.g., top and/or bottom tower sections) for the wind turbine, a nacelle 517, etc., for installing onto a monopile (see, e.g., monopile 502 of FIG. 6C) at an offshore installation site.

Figures 6C, 6D:
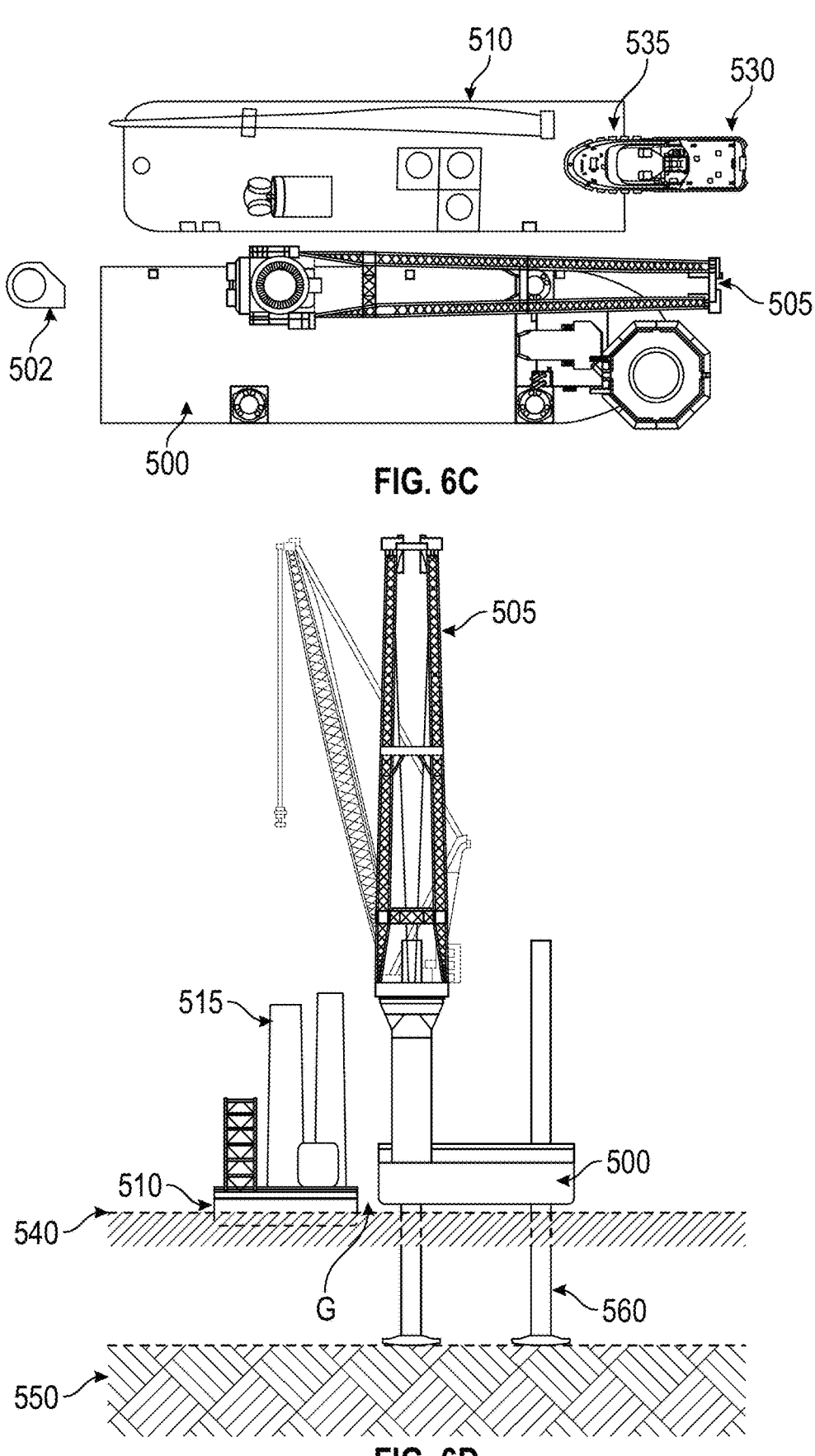
FIG. 6C illustrates a schematic top view of the vessel shown in FIG. 6A being positioned next to the offshore installation vessel according to an embodiment of the invention.
FIG. 6D illustrates a schematic side view of the vessel shown in FIG. 6C being positioned next to the offshore installation vessel according to an embodiment of the invention.

As shown in FIG. 6C, as the first vessel 510 approaches the offshore installation vessel 500, the secondary vessel 530 transports and/or maneuvers the first vessel 510 alongside of the offshore installation vessel 500. As further shown in FIG. 6C, the secondary vessel 530 is able to both (i) maneuver/position the first vessel 510 alongside of the offshore installation vessel 500 and (ii) secure and/or hold the first vessel 510 alongside of the offshore installation vessel 500 using, e.g., dynamic positioning and/or the throttle of the secondary vessel 530. Once the first vessel 510 is secured and/or held alongside of the offshore installation vessel 500 using the secondary vessel 530, the various wind turbine components 515 can be transported off of the first vessel 510 to the offshore installation vessel 500 using, for example, a crane 505 positioned on the offshore installation vessel 500. For example, as shown in FIG. 6D, the offshore installation vessel 500 includes one or more stabilizing structures 560 (e.g., jack-up legs) that position the offshore installation vessel 500 on the sea floor or ocean floor 550 and at or above the ocean surface 540, as the first vessel 510 floats on the ocean surface 540. By stabilizing the offshore installation vessel 500 on the ocean floor 550 and at or above the ocean surface 540, using the one or more stabilizing structures 560 (e.g., jack-up legs), the offshore installation vessel 500 can remain stationary while the first vessel 510 floats on the ocean surface 540. By then securing and/or holding the first vessel 510 alongside of the offshore installation vessel 500 using the secondary vessel 530 (e.g., through dynamic positioning and/or the throttle), as discussed above, the various wind turbine components 515 can be effectively, efficiently, and safely transported off of the first vessel 510 to the offshore installation vessel 500 using, for example, a crane 505 positioned on the stationary offshore installation vessel 500. As further shown in FIG. 6D, as the first vessel 510 is secured and/or held alongside of the offshore installation vessel 500, a gap G of a certain distance is created between the first vessel 510 and the offshore installation vessel 500. According to one embodiment, this gap G is between zero (0) and one-hundred (100) feet. According to another embodiment, this gap G is between zero (0) and fifty (50) feet. According to another embodiment, this gap G is between zero (0) and thirty (30) feet.

Figure 7:
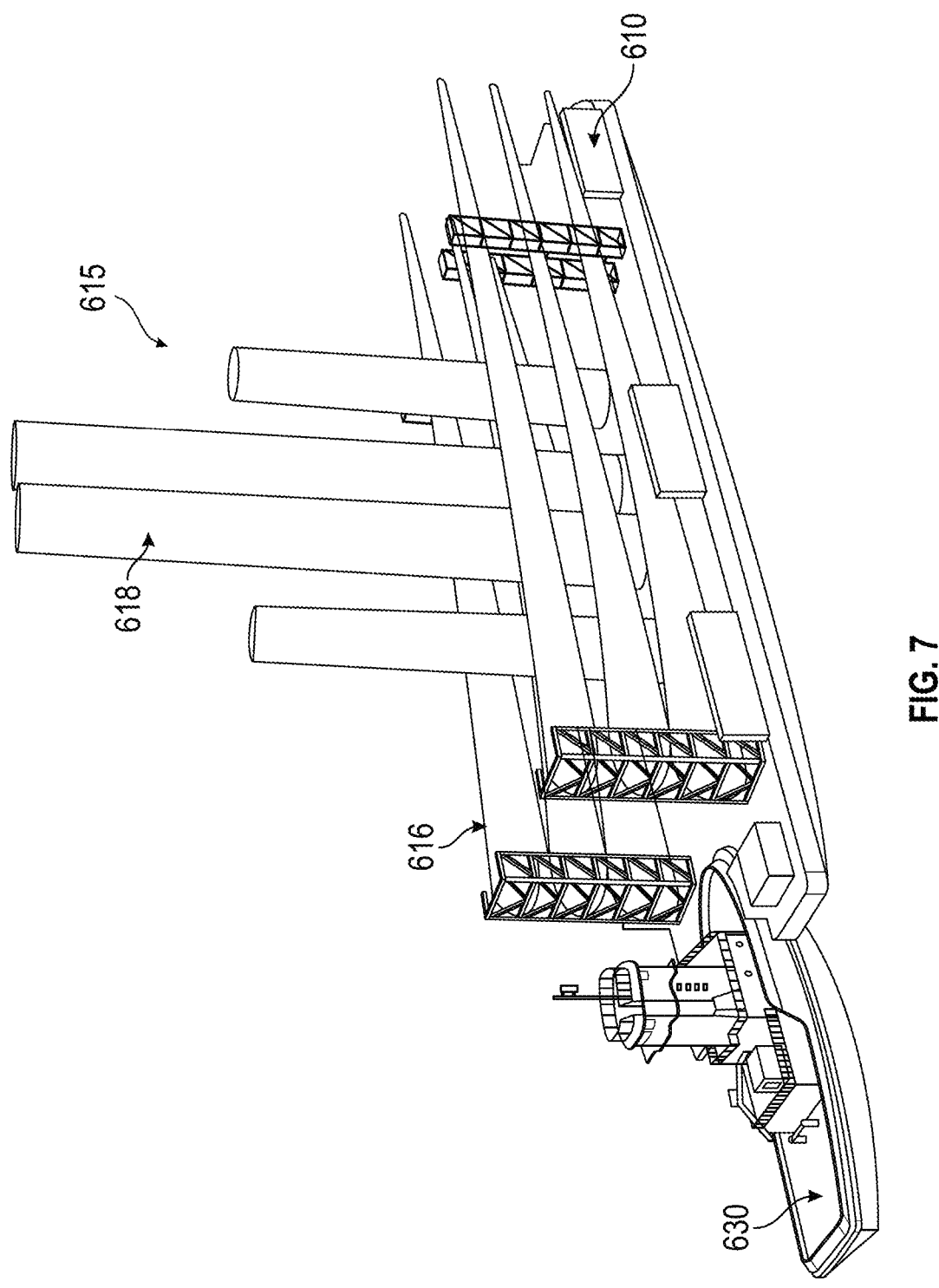
FIG. 7 is an illustration of a vessel having wind turbine components to be transported to an offshore installation vessel according to an embodiment of the invention.

FIG. 7 illustrates a vessel having wind turbine components to be transported to an offshore installation vessel according to an embodiment of the invention. As shown in FIG. 7, the vessel 610 includes wind turbine components 615, such as, e.g., one or more blades 616 for the wind turbine, tower sections 618 (e.g., top and/or bottom tower sections) for the wind turbine, a nacelle (not shown), etc., for installing onto, for example, a monopile at an offshore installation site. As further shown in FIG. 7, a secondary vessel 630 is provided for transporting, maneuvering, and/or securing the first vessel 610 alongside of an offshore installation vessel (not shown).

Figure 8:
FIG. 8 is an illustration of a vessel having a fender wall and wind turbine components to be transported to an offshore installation vessel according to an embodiment of the invention.

FIG. 8 illustrates a vessel having a fender wall and wind turbine components to be transported to an offshore installation vessel according to an embodiment of the invention. As shown in FIG. 8, the vessel 710 includes wind turbine components 715, such as, e.g., one or more blades 716 for the wind turbine, tower sections 718 (e.g., top and/or bottom tower sections) for the wind turbine, a nacelle (not shown), etc., for installing onto, for example, a monopile at an offshore installation site. As further shown in FIG. 8, a secondary vessel 730 is provided for transporting, maneuvering, and/or securing the first vessel 710 alongside of an offshore installation vessel (not shown). Moreover, as shown in FIG. 8, the vessel 710 also includes a fender wall 725, such as the fender wall(s) described above (see, e.g., FIGS. 3A, 3B, and 4A-4D).

According to another embodiment, an articulated tug-barge (ATB) is provided for transporting wind turbine components to an offshore installation vessel. An articulated tug-barge (ATB) is an integrated tug-barge that is connected by a system for dual mode operations that allows for relative motion between the tug and the barge in one or more degrees of freedom in order to have an articulated connection system. According to this embodiment, the ATB includes a first vessel (e.g., barge) that is configured to hold wind turbine components to be transported to the offshore installation vessel. The first vessel is modified to include an opening to receive a secondary vessel (e.g., a tug boat) of the ATB arrangement. According to an embodiment, both the first vessel (e.g., barge) and the secondary vessel a tug boat) are modified to provide the articulated tug-barge (ATB).

Figure 9A:
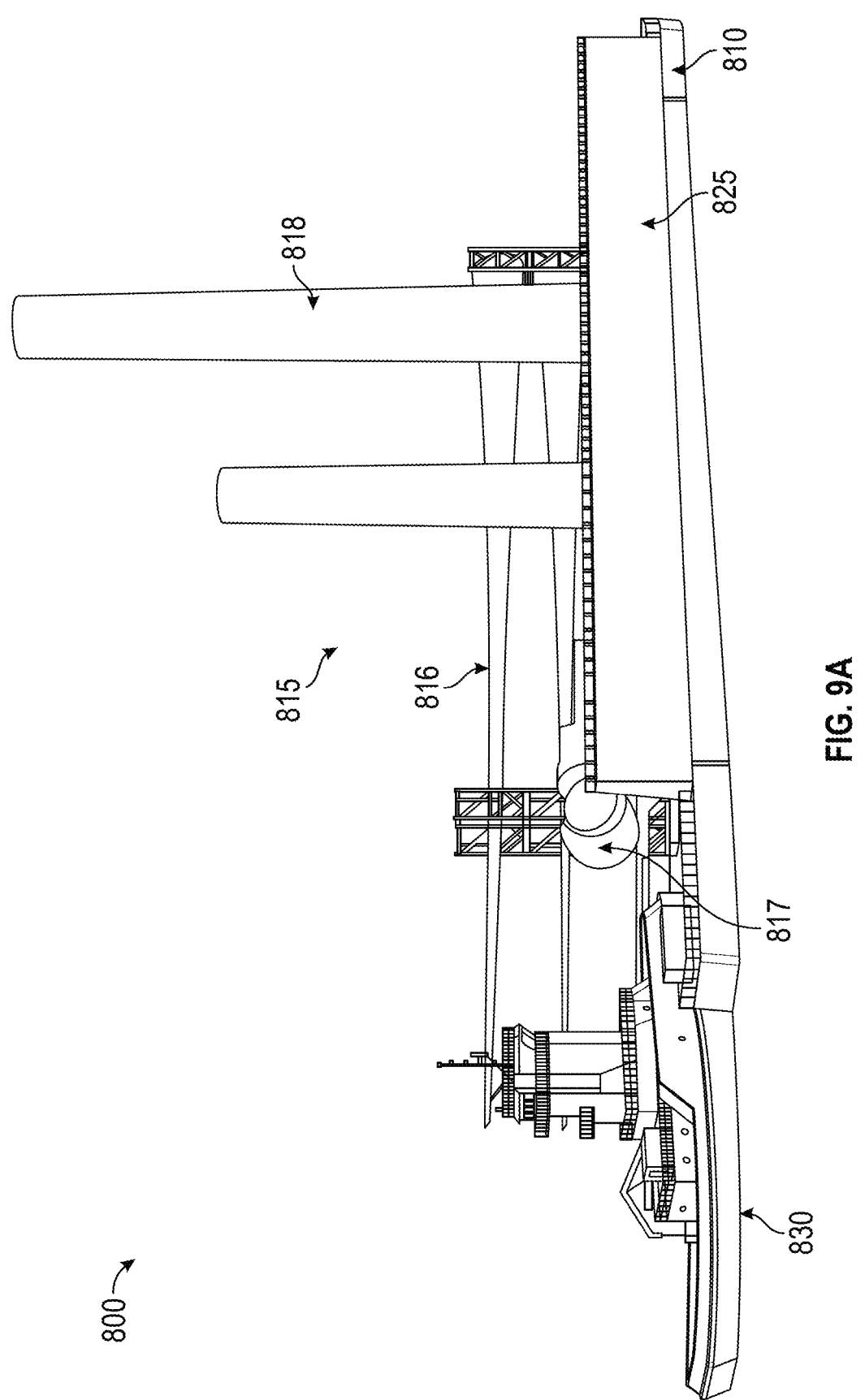
FIG. 9A is an illustration of a side view of an articulated tug-barge (ATB) that includes (i) a first vessel having a fender wall and wind turbine components to be transported to an offshore installation vessel, and (ii) a secondary vessel that integrates with the first vessel, according to an embodiment of the invention.
Figure 9B:
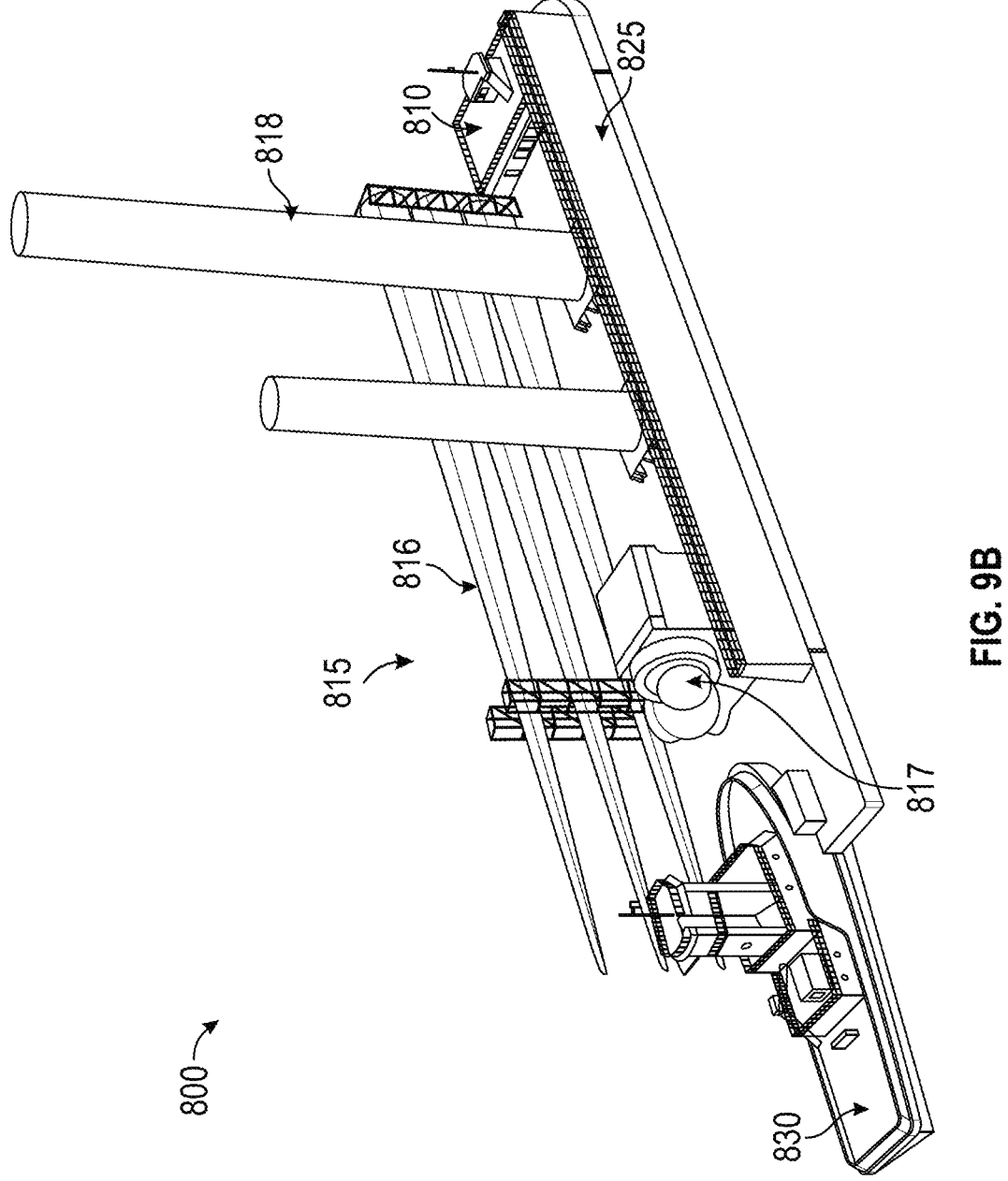
FIG. 9B is an illustration of a top view of the articulated tug-barge (ATB) shown in FIG. 9A according to an embodiment of the invention.

FIGS. 9A and 9B illustrate an articulated tug-barge (ATB) that includes (i) a first vessel having a fender wall and wind turbine components to be transported to an offshore installation vessel, and (ii) a secondary vessel that integrates with the first vessel, according to an embodiment of the invention. As shown in FIGS. 9A and 9B, an ATB 800 is provided that includes a first vessel 810 (e.g., barge) that is capable of holding wind turbine components 815, such as, e.g., three blades 816 for the wind turbine, tower sections 818 (e.g., top and/or bottom tower sections) for the wind turbine, a nacelle 817, etc., for installing onto, for example, a monopile at an offshore installation site. As further shown in FIGS. 9A and 9B, the ATB 800 also includes a secondary vessel 830 (e.g., a tug boat) is provided for transporting, maneuvering, and/or securing the first vessel 810 alongside of an offshore installation vessel (not shown). Moreover, as shown in FIGS. 9A and 9B, the vessel 810 also includes a fender wall 825, such as the fender wall(s) described above.

Figures 10A, 10B:
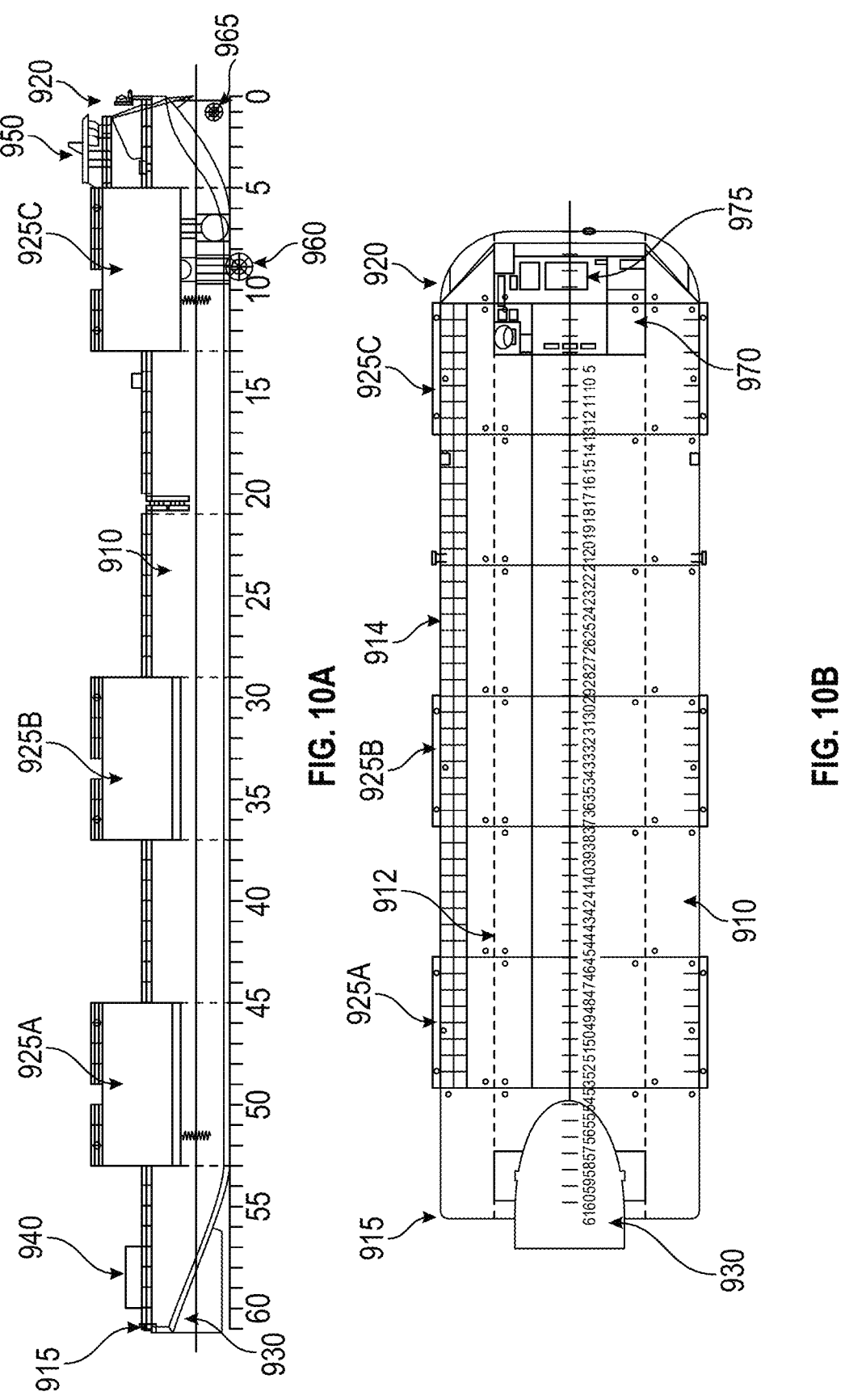
FIG. 10A is a schematic side view of a first vessel for an ATB arrangement according to an embodiment of the invention.
FIG. 10B is a schematic top view of the first vessel shown in FIG. 10A according to an embodiment of the invention.
Figure 10C:
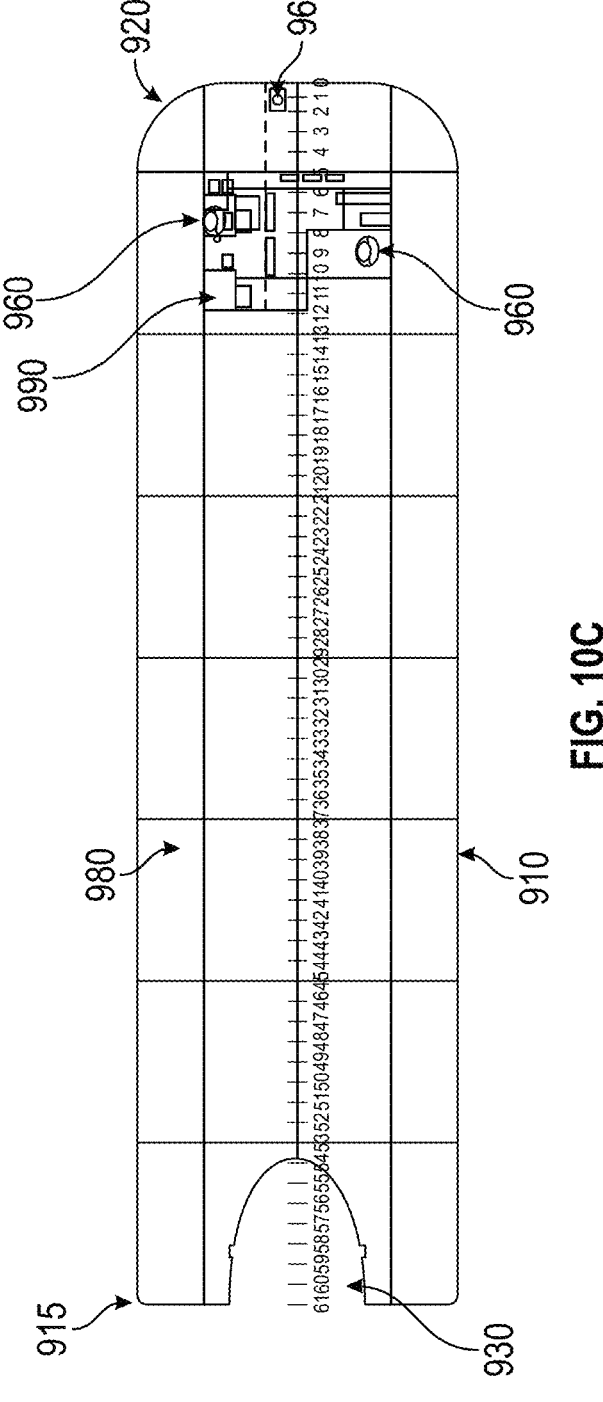
FIG. 10C is a schematic bottom view of the first vessel shown in FIGS. 10A and 10B according to an embodiment of the invention.

FIGS. 10A to 10C illustrate a first vessel (e.g., a barge) of an ATB arrangement that is outfitted with a fender wall and modified to integrate with a secondary vessel (e.g., a tug boat) of the ATB arrangement, according to an embodiment of the invention. For example, as shown in FIG. 10A, a first vessel 910 (e.g., a barge) of an ATB arrangement is outfitted with a fender wall 925A, 925B, 925C that comprises three separate sections (i.e., 925A, 925B, 925C) and is positioned or attached along one side (e.g., a port side) of the first vessel 910. Although the embodiment of FIG. 10A includes a fender wall 925A, 925B, 925C that comprises three separate sections (i.e., 925A, 925B, 925C), the fender wall could alternately comprise a single, unitary or continuous extension or wall along the one side of the vessel (see, e.g., fender wall 325 of FIG. 3A). As further shown in FIG. 10A, the rear or stern 915 of the first vessel 910 is modified to remove existing structure along the rear or stern 915 of the first vessel 910 in order to provide an opening 930 (e.g., a tug notch) to receive the secondary vessel (e.g., a tug boat) of the ATB arrangement (see also, e.g., opening 930 of FIG. 10B). According to an embodiment, the existing structure of the first vessel 910 that is removed to provide the opening 930 to receive the secondary vessel (e.g., a tug boat) of the ATB arrangement is a portion of the rear or stern 915 of the first vessel 910 that becomes the opening 930 to receive the secondary vessel. The rear or stern 915 of the first vessel 910 is further modified to include a locking mechanism 940 that is configured to connect to or interlock with a pin mechanism (not shown) provided on the secondary vessel (e.g., a tug boat) of the ATB arrangement that is described in further detail below. The front or bow 920 of the first vessel 910 includes a deckhouse 950 (e.g., a forward navigation lookout "bridge") that allows for the monitoring of various obstructions and/or vessels during the transporting of wind turbine components (such as, e.g., via human sight and/or via various remote cameras, radars, and/or sensors), as well as the maneuvering and/or securing of the first vessel 910 alongside of an offshore installation vessel. In addition, the front or bow 920 of the first vessel 910 is modified to include a pair of retractable thrusters 960 (e.g., z-drive thrusters or oscillating motors), as well as a tunnel thruster 965, to assist in the propulsion and/or dynamic maneuvering of the first vessel 910 during the transporting of wind turbine components, as well as the maneuvering and/or securing of the first vessel 910 alongside of an offshore installation vessel (not shown). According to an embodiment, the retractable thrusters 960 (e.g., z-drive thrusters) have a 2000 horsepower continuous power rating and 360-degree electrical non-step steering with multiple steering motors.

As shown in FIG. 10B, the first vessel 910 includes a main deck 912 with the fender wall 925A, 925B, 925C disposed along one side 914 (e.g., a port side) of the main deck 912. According to one embodiment, the fender wall 925A, 925B, 925C is made of a material that is ABS shipbuilding steel, grade A. According to an embodiment, and as discussed above, the rear or stern 915 of the first vessel 910 is modified to provide an opening 930 to receive the secondary vessel (e.g., a tug boat) of the ATB arrangement. According to another embodiment, the front or bow 920 of the first vessel 910 includes a machinery house 970 to house one or more engines 975, such as, e.g., a genset, to provide the energy necessary to power the various components of the first vessel 910. According to one embodiment, the one or more engines 975, such as, e.g., a genset, are provided for two independent power generation systems that include (i) a dynamic positioning system (DPS) of the ATB and (ii) power generation for the wind turbine equipment.

As shown in FIG. 10C, the first vessel 910 further includes a bottom or hull 980 that includes the opening 930 at the rear or stern 915 of the first vessel 910 to receive the secondary vessel (e.g., a tug boat) of the ATB arrangement. As also shown in FIG. 10C, the first vessel 910 further includes a thruster room 990 that houses the pair of retractor thrusters 960 (discussed above), as well as the tunnel thruster 965 (discussed above), near the front or bow 920 of the first vessel 910.

Figure 11A:
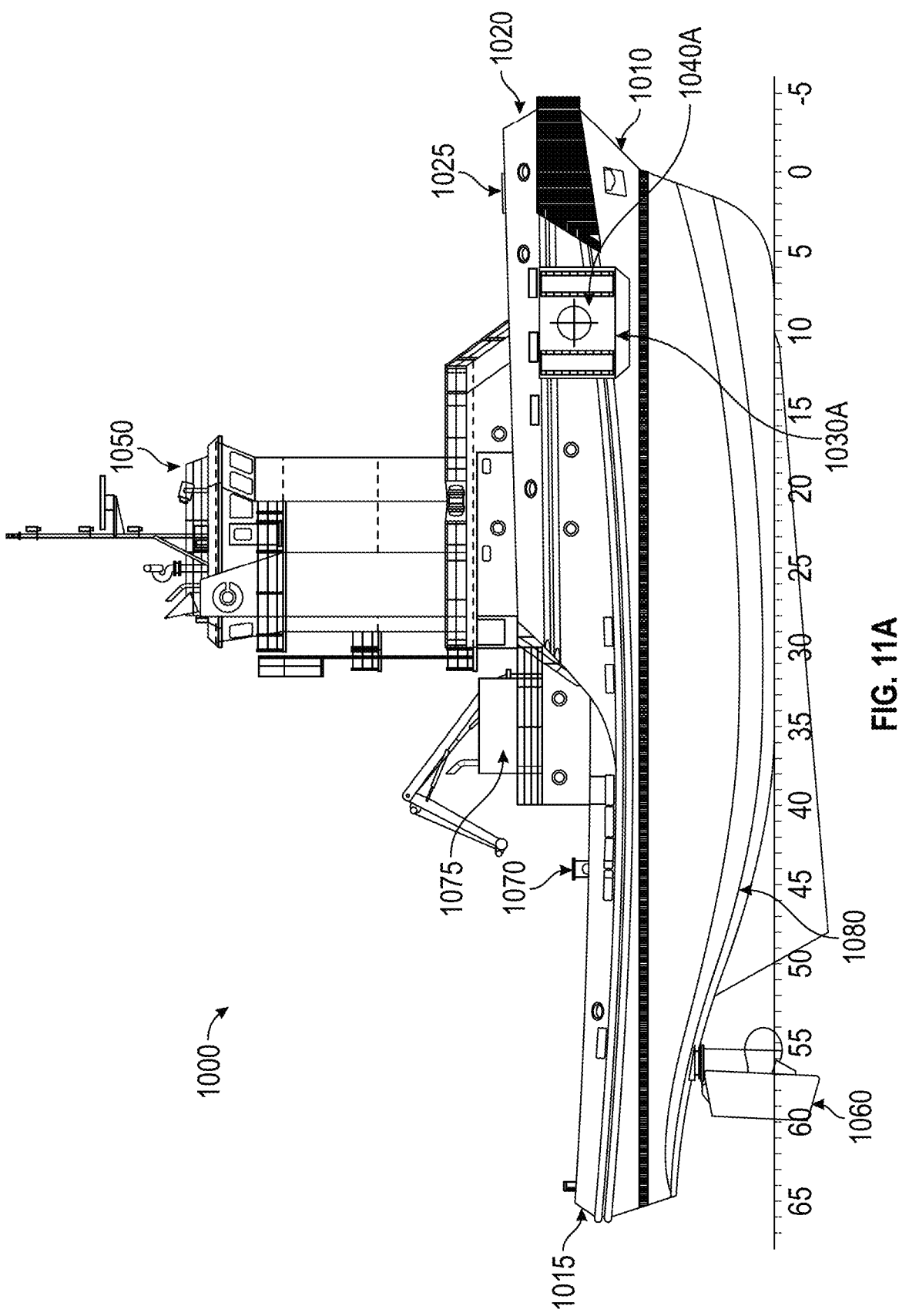
FIG. 11A is a schematic side view of a secondary vessel for an ATB arrangement according to an embodiment of the invention.
Figure 11B:
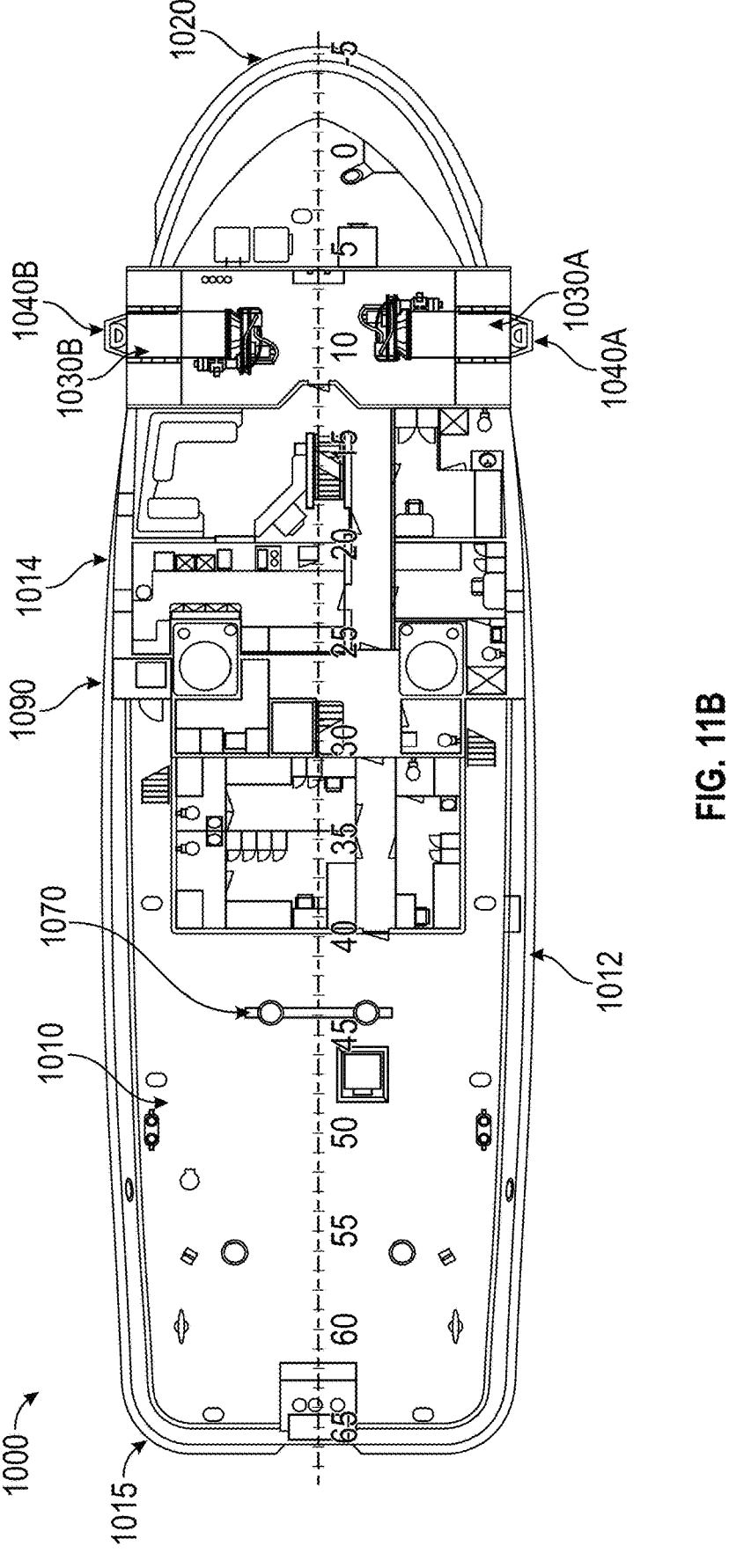
FIG. 11B is a schematic top view of the secondary vessel shown in FIG. 11A according to an embodiment of the invention.

FIGS. 11A and 11B illustrate a secondary vessel (e.g., a tug boat) of an ATB arrangement that is modified to integrate with the first vessel (e.g., barge) of the ATB arrangement, according to an embodiment of the invention. For example, as shown in FIG. 11A, a secondary vessel 1000 (e.g., a tug boat) of an ATB arrangement is provided that includes a main deck 1010, a boarding platform 1025 near the front or bow 1020 of the secondary vessel 1000 that allows for passage between the first vessel (e.g., barge) and the secondary vessel 1000, and a pilothouse 1050 that includes a control station for controlling propulsion and/or dynamic maneuvering (e.g., the dynamic positioning system (DPS)) of the secondary vessel 1000 and/or the first vessel (e.g., barge) of the ATB arrangement. According to an embodiment, the front or bow 1020 of the secondary vessel 1000, along with the main deck 1010 and the boarding platform 1025, are configured to be positioned within an opening provided within the first vessel (see, e.g., opening 930 of first vessel 910 of FIGS. 10B and 10C) in order to integrate the first vessel 910 with the secondary vessel 1000 for the ATB arrangement (see, e.g., FIGS. 9A and 9B). According to one embodiment, the secondary vessel 1000 further includes and/or is modified to include a pin mechanism (or pin box) 1030A, 1030B that is positioned on both sides of the secondary vessel 1000 (see, e.g., FIG. 11B). The pin mechanism 1030A, 1030B, which is positioned near the front or bow 1020 of the secondary vessel 1000, is configured to engage with a locking mechanism of the first vessel (see, e.g., locking mechanism 940 of first vessel 910 of FIG. 10A) when the secondary vessel 1000 is positioned within an opening provided within the first vessel (see, e.g., opening 930 of first vessel 910 of FIGS. 10B and 10C) in order to connect or integrate the first vessel with the secondary vessel 1000 of the ATB arrangement (see, e.g., FIGS. 9A and 9B). As shown in FIG. 11B, a first pin mechanism 1030A is positioned on a first side 1012 (e.g., a starboard side) of the secondary vessel 1000, while a second pin mechanism 1030B is positioned on a second side 1014 (e.g., a port side) of the secondary vessel 1000. Each of the first and second pin mechanisms 1030A and 1030B includes a pin member 1040A and 1040B, respectively, that is configured to extend from the respective pin mechanism 1030A, 1030B in order to engage or connect with the locking mechanism of the first vessel (see, e.g., locking mechanism 940 of first vessel 910 of FIG. 10A). (See also, e.g., connection of a barge to a tug boat as described in U.S. Pat. No. 6,199,501, which is incorporated by reference herein in its entirety.) According to one embodiment, the connection between the pin mechanism 1030A, 1030B of the secondary vessel 1000 and the locking mechanism of the first vessel (see, e.g., locking mechanism 940 of first vessel 910 of FIG. 10A) provides a stable connection that allows for an easier and a safer means for the crew to move between the first vessel (e.g., barge) and the secondary vessel 1000 (e.g., tug boat) of the ATB arrangement during the securing (or mooring) of the first vessel to an offshore installation vessel for off-loading and/or installation of wind turbine components at an off-shore location.

As further shown in the embodiment of FIG. 11A, the secondary vessel 1000 further includes and/or is modified to include a retractable thruster 1060 (e.g., a z-drive thruster) near the rear or stern 1015 of the secondary vessel 1000, along the bottom or hull 1080 of the secondary vessel 1000. The retractable thruster 1060 (e.g., a z-drive thruster) is provided to assist in the propulsion and/or dynamic maneuvering of the secondary vessel 1000, as well as the first vessel (e.g., first vessel 910 of FIGS. 10A to 10C) of the ATB arrangement, during the transporting of wind turbine components, as well as the maneuvering and/or securing of the first vessel and/or the secondary vessel 1000 alongside of an offshore installation vessel (not shown). According to one embodiment, the retractable thruster 1060 of the secondary vessel 1000, as well as the thrusters provided on the first vessel (see, e.g., pair of retractable thrusters 960 and tunnel thruster 965 of the first vessel 910 of FIGS. 10A to 10C), allow for the first vessel (e.g., barge) of the ATB arrangement to be positioned in a hover pattern off of the offshore installation vessel for securing (or mooring) of the first vessel to the offshore installation vessel and/or for off-loading and/or installation of wind turbine components at an offshore location.

As also shown in the embodiment of FIGS. 11A and 11B, the secondary vessel 1000 can also include an emergency tow mechanism 1070 along the main deck 1010 in the event the first vessel and/or another vessel is needing to be towed back to port. As further shown in FIG. 11A, the secondary vessel 1000 can include an emergency generator space 1075 for including a generator (not shown) that may be needed in the event of a power outage or interruption of normal power. According to an embodiment, the emergency generator space 1075 can be included in place of, e.g., an oil recovery skiff that may be present in pre-existing tug boats. As also shown in FIG. 11B, the secondary vessel 1000 can further include one or more staterooms, sleeping rooms, restrooms, and/or mess halls 1090 for accommodating the crew working on the secondary vessel 1000.

According to one embodiment, in an ATB arrangement, at least one of the first vessel (e.g., vessel 810 of FIGS. 9A and 9B) and/or the secondary vessel (e.g., vessel 830 of FIGS. 9A and 9B) is unmanned. According to one embodiment, in an ATB arrangement, at least one of the first vessel (e.g., vessel 810 of FIGS. 9A and 9B) and/or the secondary vessel (e.g., vessel 830 of FIGS. 9A and 9B) is manned.

According to an embodiment, one or more remote cameras, radars, and/or sensors are provided to at least one of (i) the front or bow of the first vessel and/or the secondary vessel and (ii) the rear or stern of the first vessel and/or the secondary vessel, to remotely sense various obstructions and/or vessels during the transporting of wind turbine components, as well as the maneuvering and/or securing of the first vessel alongside of an offshore installation vessel.

According to an embodiment, an ATB arrangement of a first vessel (e.g., a barge) with a secondary vessel (e.g., a tug boat) allows for transportation of wind turbine components to an offshore location during certain conditions (e.g., rough weather or windy conditions) that might not be possible with other means of transporting wind turbine components to an offshore installation vessel (such as, e.g., the embodiment of FIGS. 1A to 1F in which a pair of tow lines are used to maneuver a first vessel (e.g., a barge) to an offshore location).

According to an embodiment, the propulsion and/or dynamic maneuvering of the first vessel (e.g., barge) (see, e.g., first vessel 910 of FIGS. 10A to 10C) and/or the secondary vessel (e.g., a tug boat) (see, e.g., secondary vessel 1000 of FIGS. 11A and 11B) of the ATB arrangement is accomplished via remote control.

Further aspects of the present disclosure are provided by the subject matter of the following clauses.

A method of transporting a first vessel having wind turbine components to an offshore installation vessel that includes (i) securing the first vessel to a second vessel using a first tow line attached to a front end (or bow) of the first vessel, (ii) securing the first vessel to a third vessel using a second tow line attached to a back end (or stern) of the first vessel, (iii) transporting the first vessel to the offshore installation vessel using the second vessel and the third vessel secured to the first vessel via the first and second tow lines, respectively, and (iv) securing the first vessel to the offshore installation vessel.

The method of any preceding clause, wherein the first vessel includes one or more fender walls.

The method of any preceding clause, wherein the method further includes offloading the wind turbine components from the first vessel to the offshore installation vessel.

The method of any preceding clause, wherein the step of offloading the wind turbine components from the first vessel to the offshore installation vessel is conducted using a crane disposed on the offshore installation vessel.

The method of any preceding clause, wherein the step of securing the first vessel to the offshore installation vessel is conducted using one or more mooring lines.

The method of any preceding clause, wherein the one or more mooring lines are passed from the offshore installation vessel to the first vessel.

The method of any preceding clause, wherein the one or more mooring lines comprise: (i) a first mooring line that is passed from a front end of the offshore installation vessel to the front end of the first vessel, (ii) a second mooring line that is passed from a back end of the offshore installation vessel to the back end of the first vessel, (iii) a third mooring line that is passed from a first side of the offshore installation vessel to a first side of the first vessel, and (iv) a fourth mooring line that is passed from the first side of the offshore installation vessel to the first side of the first vessel.

The method of any preceding clause, wherein the wind turbine components comprise at least one of (i) one or more wind blades, (ii) one or more tower sections, and (iii) a nacelle.

The method of any preceding clause, wherein the offshore installation vessel remains stationary using one or more stabilizing structures, while the first vessel floats on the ocean surface.

A method of transporting a first vessel having wind turbine components to an offshore installation vessel in which the first vessel has fender walls that includes (i)

providing a first vessel having one or more fender walls attached to at least one side of the first vessel, (ii) securing the first vessel to a second vessel using a first tow line attached to a front end (or bow) of the first vessel, (iii) securing the first vessel to a third vessel using a second tow line attached to a back end (or stern) of the first vessel, (iv) transporting the first vessel to the offshore installation vessel using the second vessel and the third vessel secured to the first vessel via the first and second tow lines, respectively, and (v) securing the first vessel to the offshore installation vessel, such that the one or more fender walls of the first vessel are positioned between the first vessel and the off-shore installation vessel once the first vessel is secured to the offshore installation vessel.

The method of any preceding clause, wherein the first vessel may include at least two fender walls.

The method of any preceding clause, wherein the method further includes offloading the wind turbine components from the first vessel to the offshore installation vessel.

The method of any preceding clause, wherein the step of offloading the wind turbine components from the first vessel to the offshore installation vessel is conducted using a crane disposed on the offshore installation vessel.

The method of any preceding clause, wherein the step of securing the first vessel to the offshore installation vessel is conducted using one or more mooring lines.

The method of any preceding clause, wherein the one or more mooring lines are passed from the offshore installation vessel to the first vessel.

The method of any preceding clause, wherein the one or more mooring lines comprise: (i) a first mooring line that is passed from a front end of the offshore installation vessel to the front end of the first vessel, (ii) a second mooring line that is passed from a back end of the offshore installation vessel to the back end of the first vessel, (iii) a third mooring line that is passed from a first side of the offshore installation vessel to a first side of the first vessel, and (iv) a fourth mooring line that is passed from the first side of the offshore installation vessel to the first side of the first vessel.

The method of any preceding clause, wherein the wind turbine components comprise at least one of (i) one or more wind blades, (ii) one or more tower sections, and (iii) a nacelle.

The method of any preceding clause, wherein the offshore installation vessel remains stationary using one or more stabilizing structures, while the first vessel floats on the ocean surface.

A method of transporting a first vessel having wind turbine components in which the first vessel is provided with an opening to receive a secondary vessel that includes (i) providing a first vessel having an opening to receive a secondary vessel. (ii) positioning the secondary vessel within the opening of the first vessel, and (iii) transporting the first vessel to the offshore installation vessel using the secondary vessel.

The method of any preceding clause, wherein the first vessel includes one or more fender walls.

The method of any preceding clause, wherein the method includes securing the first vessel to the offshore installation vessel using one or more mooring lines.

The method of any preceding clause, wherein the one or more mooring lines are passed from the offshore installation vessel to the first vessel.

The method of any preceding clause, wherein the one or more mooring lines comprise: (i) a first mooring line that is passed from a front end of the offshore installation vessel to the front end of the first vessel, (ii) a second mooring line that is passed from a back end of the offshore installation vessel to the back end of the first vessel, (iii) a third mooring line that is passed from a first side of the offshore installation vessel to a first side of the first vessel, and (iv) a fourth mooring line that is passed from the first side of the offshore installation vessel to the first side of the first vessel.

The method of any preceding clause, wherein the method includes holding the first vessel alongside of the offshore installation vessel using the secondary vessel positioned within the opening of the first vessel.

The method of any preceding clause, wherein the method further includes offloading the wind turbine components from the first vessel to the offshore installation vessel.

The method of any preceding clause, wherein the step of offloading the wind turbine components from the first vessel to the offshore installation vessel is conducted using a crane disposed on the offshore installation vessel.

The method of any preceding clause, wherein the wind turbine components comprise at least one of (i) one or more wind blades, (ii) one or more tower sections, and (iii) a nacelle.

The method of any preceding clause, wherein the offshore installation vessel remains stationary using one or more stabilizing structures, while the first vessel floats on the ocean surface.

The method of any preceding clause, wherein the first vessel comprises a barge and the secondary vessel comprises a tug boat, such that the first vessel and the secondary vessel together provide an articulated tug-barge (ATB).

The method of any preceding clause, wherein the first vessel includes a locking mechanism that is configured to connect to or interlock with a pin mechanism provided on the secondary vessel when the secondary vessel is posi-tioned within the opening of the first vessel.

The method of any preceding clause, wherein the first vessel is modified to include at least one of (i) a retractable thruster and (ii) a tunnel thruster to assist in at least one of propulsion and dynamic maneuvering of the first vessel during the transporting of the wind turbine components to the offshore installation vessel.

The method of any preceding clause, wherein the sec-ondary vessel is modified to include at least one retractable thruster to assist in at least one of propulsion and dynamic maneuvering of the secondary vessel during the transporting of the wind turbine components to the offshore installation vessel.

The method of any preceding clause, wherein at least one of the first vessel and the secondary vessel is unmanned.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein.

Although the foregoing description is directed to the preferred embodiments of the invention, it is noted that other variations and modifications will be apparent to those skilled in the art, and may be made without departing from the spirit or scope of the invention. Moreover, features described in connection with one embodiment of the invention may be used in conjunction with other embodiments, even if not explicitly stated above.

The invention claimed is:

1. A method of transporting a first vessel having wind turbine components to an offshore installation vessel, the method comprising:

(i) providing the first vessel, the first vessel comprising a main deck holding the wind turbine components, with the main deck being surrounded by a front end of the first vessel, a back end of the first vessel that is opposite to the front end, a first side of the first vessel that extends from the front end to the back end of the first vessel, and a second side of the first vessel that is opposite to the first side of the first vessel and extends from the front end to the back end of the first vessel;

(ii) securing the first vessel to a second vessel using a first tow line attached to the front end of the first vessel;

(iii) securing the first vessel to a third vessel using a second tow line attached to the back end of the first vessel;

(iv) transporting the first vessel to the offshore installation vessel using the second vessel and the third vessel secured to the first vessel via the first and second tow lines, respectively; and (v) securing the first vessel to the offshore installation vessel, wherein the first side of the first vessel is modified to include one or more fender walls that extend above the main deck of the first vessel, the one or more fender walls extending along at least the first side of the first vessel and being continuous with the first side of the first vessel, wherein the one or more fender walls includes (a) a first side wall that extends from a bottom end to a top wall of the one or more fender walls in a direction that is substantially perpendicular to the main deck of the first vessel, and (b) a second side wall that extends from the bottom end to the top wall of the one or more fender walls at an angle relative to the main deck of the first vessel, and wherein the one or more fender walls are configured to be positioned along the offshore installation vessel, and wherein a combination of the first side of the first vessel and the one or more fender walls is configured to stabilize the first vessel with respect to the offshore installation vessel.

2. The method of claim 1, wherein the one or more fender walls tapers inwardly from the bottom end to the top wall of the one or more fender walls.

3. The method of claim 1, further comprising offloading the wind turbine components from the first vessel to the offshore installation vessel.

4. The method of claim 3, wherein the step of offloading the wind turbine components from the first vessel to the offshore installation vessel is conducted using a crane disposed on the offshore installation vessel.

5. The method of claim 1, wherein the step of securing the first vessel to the offshore installation vessel is conducted using one or more mooring lines.

6. The method of claim 5, wherein the one or more mooring lines are passed from the offshore installation vessel to the first vessel.

7. The method of claim 5, wherein the one or more mooring lines comprise: (i) a first mooring line that is passed from a front end of the offshore installation vessel to the front end of the first vessel, (ii) a second mooring line that is passed from a back end of the offshore installation vessel to the back end of the first vessel, (iii) a third mooring line that is passed from a first side of the offshore installation vessel to a first side of the first vessel, and (iv) a fourth mooring line that is passed from the first side of the offshore installation vessel to the first side of the first vessel.

8. The method of claim 1, wherein the wind turbine components comprise at least one of (i) one or more wind blades, (ii) one or more tower sections, and (iii) a nacelle.

9. The method of claim 1, wherein the offshore installation vessel remains stationary using one or more stabilizing structures, while the first vessel floats on the ocean surface.

10. The method of claim 1, wherein at least one wall of the one or more fender walls includes openings to allow for access to the offshore installation vessel.

11. The method of claim 1, wherein the first side wall of the one or more fender walls is disposed along an outboard side of the one or more fender walls that is configured to be disposed against the offshore installation vessel, and the second side wall of the one or more fender walls is disposed along an inboard side of the one or more fender walls, with the second side wall further including openings to allow for access to the offshore installation vessel.

12. A method of transporting a first vessel having wind turbine components to an offshore installation vessel, the method comprising:

(i) providing a first vessel having a main deck holding the wind turbine components, with the main deck being surrounded by a front end of the first vessel, a back end of the first vessel that is opposite to the front end, a first side of the first vessel that extends from the front end to the back end of the first vessel, and a second side of the first vessel that is opposite to the first side of the first vessel and extends from the front end to the back end of the first vessel, wherein the first side of the first vessel includes one or more fender walls attached to and continuous with at least the first side of the first vessel that extend above the main deck of the first vessel and along at least the first side of the first vessel, wherein the one or more fender walls tapers inwardly from a bottom end to a top wall of the one or more fender walls;

(ii) securing the first vessel to a second vessel using a first tow line attached to the front end of the first vessel; and (iii) securing the first vessel to a third vessel using a second tow line attached to the back end of the first vessel;

(iv) transporting the first vessel to the offshore installation vessel using the second vessel and the third vessel secured to the first vessel via the first and second tow lines, respectively; and (v) securing the first vessel to the offshore installation vessel, such that the one or more fender walls of the first vessel are positioned between the first vessel and the offshore installation vessel once the first vessel is secured to the offshore installation vessel, wherein a combination of the first side of the first vessel and the one or more fender walls is configured to stabilize the first vessel with respect to the offshore installation vessel.

13. The method of claim 12, wherein the first vessel includes at least two fender walls.

14. The method of claim 12, further comprising offloading the wind turbine components from the first vessel to the offshore installation vessel.

15. The method of claim 14, wherein the step of offloading the wind turbine components from the first vessel to the offshore installation vessel is conducted using a crane disposed on the offshore installation vessel.

16. The method of claim 12, wherein the step of securing the first vessel to the offshore installation vessel is conducted using one or more mooring lines.

17. The method of claim 16, wherein the one or more mooring lines are passed from the offshore installation vessel to the first vessel.

18. The method of claim 16, wherein the one or more mooring lines comprise: (i) a first mooring line that is passed from a front end of the offshore installation vessel to the front end of the first vessel, (ii) a second mooring line that is passed from a back end of the offshore installation vessel to the back end of the first vessel, (iii) a third mooring line that is passed from a first side of the offshore installation vessel to a first side of the first vessel, and (iv) a fourth mooring line that is passed from the first side of the offshore installation vessel to the first side of the first vessel.

19. The method of claim 12, wherein the wind turbine components comprise at least one of (i) one or more wind blades, (ii) one or more tower sections, and (iii) a nacelle.

20. The method of claim 12, wherein the offshore installation vessel remains stationary using one or more stabilizing structures, while the first vessel floats on the ocean surface.

21. The method of claim 12, wherein at least one wall of the one or more fender walls includes openings to allow for access to the offshore installation vessel.

22. A method of transporting a first vessel having wind turbine components to an offshore installation vessel, the method comprising:

(i) providing a first vessel comprising a main deck holding the wind turbine components, with the main deck being surrounded by a front end of the first vessel, a back end of the first vessel that is opposite to the front end, a first side of the first vessel that extends from the front end to the back end of the first vessel, and a second side of the first vessel that is opposite to the first side of the first vessel and extends from the front end to the back end of the first vessel, the first vessel further having an opening to receive a secondary vessel;

(ii) positioning the secondary vessel within the opening of the first vessel; and (iii) transporting the first vessel to the offshore installation vessel using the secondary vessel, wherein the first side of the first vessel is modified to include one or more fender walls that extend above the main deck of the first vessel, the one or more fender walls extending along at least the first side of the first vessel and being continuous with the first side of the first vessel, wherein the one or more fender walls includes (a) a first side wall that extends from a bottom end to a top wall of the one or more fender walls in a direction that is substantially perpendicular to the main deck of the first vessel, and (b) a second side wall that extends from the bottom end to the top wall of the one or more fender walls at an angle relative to the main deck of the first vessel, and wherein the one or more fender walls are configured to be positioned along the offshore installation vessel, and wherein a combination of the first side of the first vessel and the one or more fender walls is configured to stabilize the first vessel with respect to the offshore installation vessel.

23. The method of claim 22, wherein the one or more fender walls tapers inwardly from the bottom end to the top wall of the one or more fender walls.

24. The method of claim 22, further comprising securing the first vessel to the offshore installation vessel using one or more mooring lines.

25. The method of claim 24, wherein the one or more mooring lines are passed from the offshore installation vessel to the first vessel.

26. The method of claim 24, wherein the one or more mooring lines comprise: (i) a first mooring line that is passed from a front end of the offshore installation vessel to the front end of the first vessel, (ii) a second mooring line that is passed from a back end of the offshore installation vessel to the back end of the first vessel, (iii) a third mooring line that is passed from a first side of the offshore installation vessel to a first side of the first vessel, and (iv) a fourth mooring line that is passed from the first side of the offshore installation vessel to the first side of the first vessel.

27. The method of claim 22, further comprising holding the first vessel alongside of the offshore installation vessel using the secondary vessel positioned within the opening of the first vessel.

28. The method of claim 22, further comprising offloading the wind turbine components from the first vessel to the offshore installation vessel.

29. The method of claim 28, wherein the step of offloading the wind turbine components from the first vessel to the offshore installation vessel is conducted using a crane disposed on the offshore installation vessel.

30. The method of claim 22, wherein the wind turbine components comprise at least one of (i) one or more wind blades, (ii) one or more tower sections, and (iii) a nacelle.

31. The method of claim 22, wherein the offshore installation vessel remains stationary using one or more stabilizing structures, while the first vessel floats on the ocean surface.

32. The method of claim 22, wherein the first vessel comprises a barge and the secondary vessel comprises a tug boat, such that the first vessel and the secondary vessel together provide an articulated tug-barge (ATB).

33. The method of claim 32, wherein the first vessel includes a locking mechanism that is configured to connect to or interlock with a pin mechanism provided on the secondary vessel when the secondary vessel is positioned within the opening of the first vessel.

34. The method of claim 32, wherein the first vessel is modified to include at least one of (i) a retractable thruster and (ii) a tunnel thruster to assist in at least one of propulsion and dynamic maneuvering of the first vessel during the transporting of the wind turbine components to the offshore installation vessel.

35. The method of claim 32, wherein the secondary vessel is modified to include at least one retractable thruster to assist in at least one of propulsion and dynamic maneuvering of the secondary vessel during the transporting of the wind turbine components to the offshore installation vessel.

36. The method of claim 32, wherein at least one of the first vessel and the secondary vessel is unmanned.

37. The method of claim 22, wherein at least one wall of the one or more fender walls includes openings to allow for access to the offshore installation vessel.

38. The method of claim 22, wherein the first side wall of the one or more fender walls is disposed along an outboard side of the one or more fender walls that is configured to be disposed against the offshore installation vessel, and the second side wall of the one or more fender walls is disposed along an inboard side of the one or more fender walls, with the second side wall further including openings to allow for access to the offshore installation vessel.

* * * * *